(12) United States Patent
Ezrielev et al.

(10) Patent No.: US 12,536,485 B2
(45) Date of Patent: Jan. 27, 2026

(54) REMEDIATING IMPAIRED DEVICES

(71) Applicant: Dell Products L.P., Round Rock, TX (US)

(72) Inventors: Ofir Ezrielev, Beer Sheva (IL); Boris Shpilyuck, Ashdod (IL); Igor Dubrovsky, Beer Sheva (IL); Nisan Haimov, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 312 days.

(21) Appl. No.: 18/345,338

(22) Filed: Jun. 30, 2023

(65) Prior Publication Data

US 2025/0005476 A1    Jan. 2, 2025

(51) Int. Cl.
*G06Q 30/00*    (2023.01)
*G06Q 10/0631*  (2023.01)

(52) U.S. Cl.
CPC .............. *G06Q 10/06315* (2013.01)

(58) Field of Classification Search
None
See application file for complete search history.

(56) References Cited

U.S. PATENT DOCUMENTS

| | | | |
|---|---|---|---|
| 7,818,673 B2 | 10/2010 | Cunningham | |
| 11,159,609 B2 | 10/2021 | McGrath et al. | |
| 11,218,546 B2 | 1/2022 | Spoczynski et al. | |
| 11,366,694 B1 | 6/2022 | Aronovich | |
| 11,652,872 B1 | 5/2023 | Parla et al. | |
| 2014/0108347 A1 | 4/2014 | Lee | |
| 2017/0061351 A1* | 3/2017 | Lee | G06Q 40/03 |
| 2017/0076408 A1* | 3/2017 | D'Souza | G06Q 20/10 |
| 2020/0379999 A1* | 12/2020 | Xia | G06F 16/244 |
| 2021/0011448 A1* | 1/2021 | Coleman | G06Q 30/0283 |
| 2021/0398187 A1* | 12/2021 | Tennur Narayanan | G06Q 30/012 |
| 2021/0406976 A1* | 12/2021 | Sethi | G06Q 30/0631 |
| 2022/0179692 A1 | 6/2022 | Aronovich | |
| 2022/0179697 A1 | 6/2022 | Kumar et al. | |
| 2022/0376971 A1 | 11/2022 | Xiao | |
| 2024/0121178 A1 | 4/2024 | Liu | |

OTHER PUBLICATIONS

Optimization of Industrial-Scall Assemble-to-Order Systems. Informs Journal on Computing, vol. 27, No. 3, Summer 2015, pp. 544-560 (Year: 2015).*

* cited by examiner

*Primary Examiner* — Matthew T Sittner
(74) *Attorney, Agent, or Firm* — WOMBLE BOND DICKINSON (US) LLP

(57) ABSTRACT

Methods and systems for remediating impaired devices in a deployment are disclosed. The devices may be remediated by repairing or replacing the devices. Whether to repair or replace the devices may depend on the operational and performance costs of running the impaired devices in the deployment. Operational costs may include the retail price of the device and any energy requirements to run the impaired device. Performance costs may include effects of the output of the impaired device on other devices along the pathway of devices. If the integrated costs of the operational costs and performance costs outweigh the sum of the individual operational costs and performance costs, then the device may be replaced; otherwise, the device may be repaired.

20 Claims, 15 Drawing Sheets

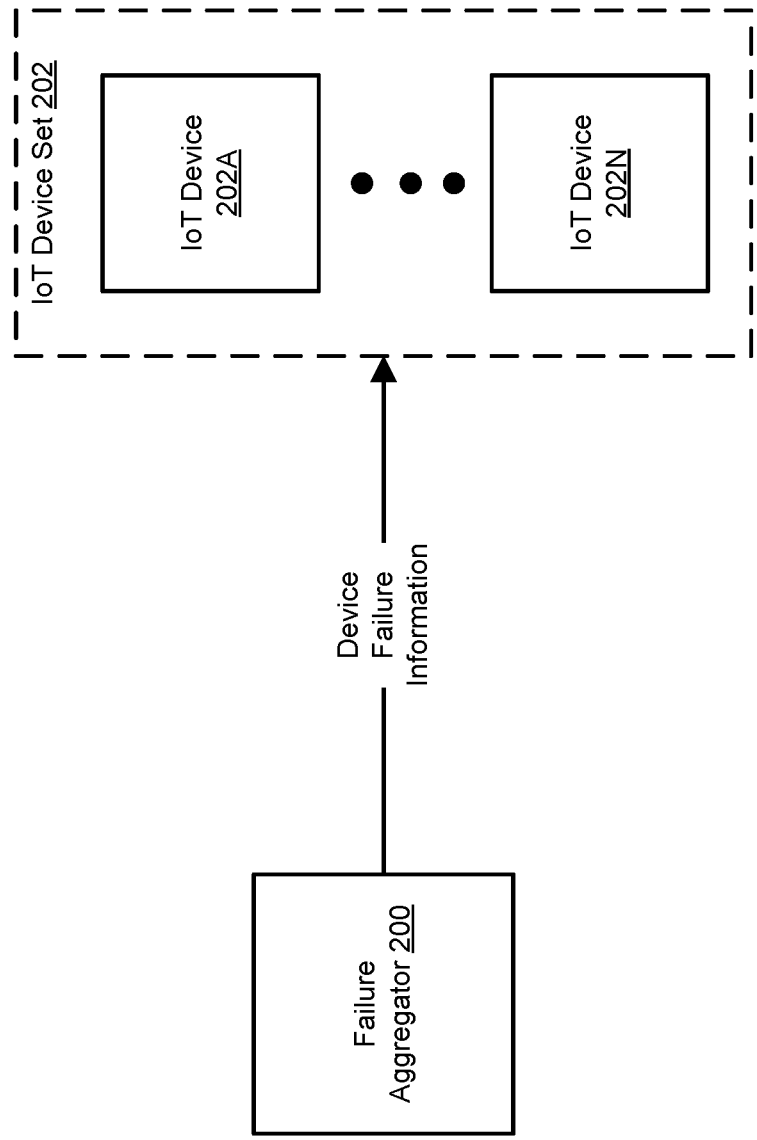

REMEDIATING IMPAIRED DEVICES

FIELD

Embodiments disclosed herein relate generally to device management. More particularly, embodiments disclosed herein relate to remediating impaired devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A shows a first data flow diagram illustrating operation of a portion of a system in accordance with an embodiment.

DETAILED DESCRIPTION

Figure 1:
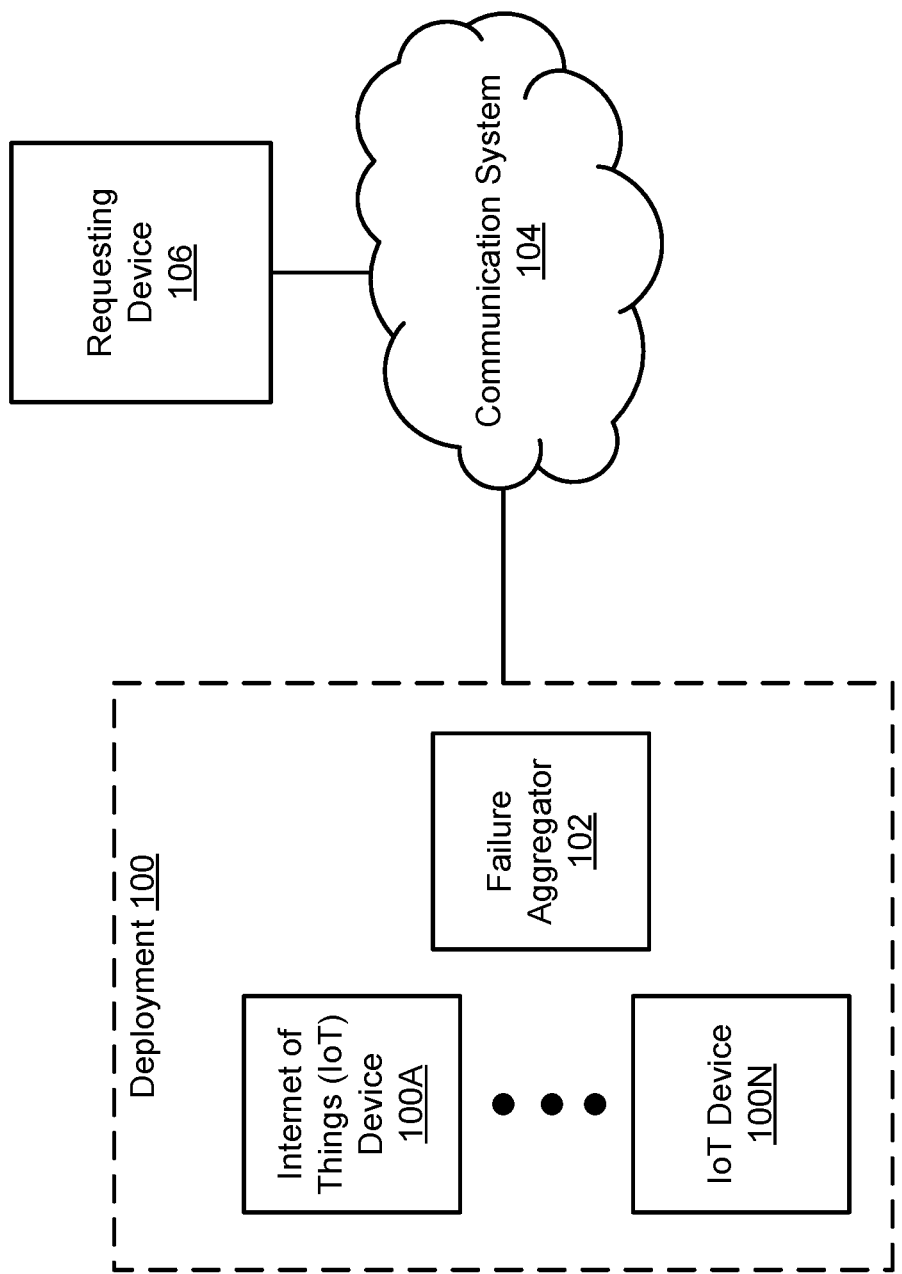
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to the methods and systems related to remediating devices within a deployment. A deployment may host one or more within a set of devices within a network of devices. The network of devices may include sensors that read data from the outside world and data processing tools that process data into varying formats for processing by other devices or human-readable formats. In a human-readable format, the data may be sent through a communications device to an end user. The communications device may include a network through which to transmit data or the Internet. Inclusion of the communications device between the deployment and the end user may be such that the end user may not need to be within local proximity of the deployment. In not needing to be within local proximity of the deployment, the end user may not need to be within local proximity of the devices. In not needing to be within local proximity of the devices, an end user may expect to employ the deployment at any location as long as the end user maintains a connection with the communications device. However, should any of the devices experience a failure of operation, maintenance and remediation of the devices may require intervention by the end user. In requiring intervention by the end user, convenience of remote design of the deployment may be removed. In removing the remote design of the deployment, human intervention, by an administrator or end user, may be required when maintenance or remediation of one or more devices may be needed. To maintain the remote design of the deployment, the deployment may be equipped with redundant devices. The redundant devices may become operational when operational devices experience failures of operation. In the case of failure of operation by devices within the deployment, operation of redundant devices may maintain normal operation of the deployment.

The deployment may operate using a failure aggregator. The failure aggregator may be a device that may exist among the set of devices within a network of devices in the deployment. The failure aggregator may catalogue failures of operation of the devices within a deployment. To catalogue failures of operation, it may require a device to send notice of failure of operation when the device fails to operate. Also, to catalogue failures of operation, the failure aggregator may require a device to send notice of failure of operation concerning other devices with which it may share an operational connection.

In cataloguing failures of operation, the failure aggregator may generate a network map of operational connections between devices. If queried by a device, the failure aggregator may parse the network map and send operational pathways from the network map that may be applicable to the device. In receiving operational pathways, the device may understand what pathways contain functional devices and devices with failures of operation. In knowing the contents of pathways, a device may decide which pathway to use to execute operations.

In the event of a failure of operation by a failed device, a device may utilize a redundant device along a pathway from the network map. However, the redundant device may not be exactly similar in functionality to the failed device. To maintain similarity between the failed device and redundant device, a machine learning model may be employed.

In the event that redundant devices may not exist in the deployment, the failure aggregator may be equipped with a digital twin. With a digital twin, a device with a failure of operation may be substituted. In substitution of a device with a failure of operation, the digital twin may contain software appropriate for simulating operation of the device. In simulating operations of the device, the digital twin may maintain operation of the along the pathway where a device may contain a failure of operation. In maintaining operation along the pathway, the digital twin may maintain operation of the deployment.

Although the digital twin may be tasked to simulating operations of a device with a failure of operation, there may be differences in operation between the device and simulation by the digital twin. The presence of differences may apply for all devices with respect to simulation by the digital twin. To measure the differences in operation, a set of machine learning models, one for each device, may be tasked to learn the differences in operation between a device and the simulation of the digital twin. Each machine learning model may quantify the uncertainty in a difference in operation, given the conditions that a machine learning model may input.

Using the trained machine learning models and the set of devices that experience a failure of operation, a list of impaired devices may be generated. The list of impaired devices may be prioritized based on differences in operation and the uncertainty quantification from the trained machine learning model. Following prioritization by list of impaired devices, available resources may be allocated to remediate the impaired devices of the deployment.

If an impaired device may be identified, a cost analysis may be performed to decide whether to repair or replace the impaired device. In deciding whether to repair or replace the impaired device, the cost analysis may consider operational and performance costs of the impaired device. Operational costs may include the retail price of a new device and the energy required to run the impaired device. Performance costs may include output effects of the impairment downstream to other devices in the pathway. A combined cost may be computed that may include compounded effects of operational and performance costs. If the combined cost may be higher than the compounded effects of the operational cost and performance cost, then the device may be replaced. However, if the combined cost may not be higher than the compounded effects of the operational cost and performance cost, then the device may be repaired. In this way, an approach may be taken to deciding whether to repair or replace an impaired device.

In an embodiment, a method for remediating devices within a deployment is provided. The method may include (i) identifying an impairment of a device of a set of devices of the deployment that prevents at least one cooperative process to be performed by the deployment (ii) performing an operational cost analysis of the device to obtain a first cost estimate, (iii) performing a performance cost analysis of the device to obtain a second cost estimate, (iv) obtaining an aggregate cost estimate using the first cost estimate and the second cost estimate, (v) obtaining a third cost estimate for replacement of the device, (vi) making a determination regarding whether the aggregate is greater than the third cost estimate, (vii) in a first instance of the determination where the aggregate is greater than the third cost estimate: replacing the device with a different device to facilitate at least one cooperative process to be performed by the deployment; and (viii) in a second instance of the determination where the aggregate is less than the third cost estimate: repairing the device to facilitate at least one cooperative process to be performed by the deployment.

Prior to identifying the impairment, the method may include (i) obtaining the set of the devices of the deployment, (ii) obtaining a digital twin for the device, (iii) deploying the set of devices and the digital twin.

Identifying the impairment of the device may include typifying the impairment within the device of the set of devices of the deployment that restricts normal operation of the device.

Performing the operational cost analysis may include (i) performing an analysis of a source of the impairment within the device of the set of devices of the deployment and (ii) analyzing the requirements of the device of a set of devices of the deployment with the impairment, based on the analysis of the source of the impairment, to repair the device in order to maintain the cooperative processes to be performed by the development.

Performing the performance cost analysis comprises may include (i) obtaining a cost of a new device of the set of devices of the deployment and power requirements to run the device of the set of devices of the deployment and (ii) tracing effects of the impairment through the device of the set of devices of the deployment and through the cooperative process.

Replacing the device comprises may include acquiring outside available resources a new instantiation of the device of the set of devices of the development that is free of impairment and can operate normally within the deployment.

Repairing the device may include remediating the impairment of the device of the set of devices of the deployment with readily available resources to regain normal operation of the device of the set of devices of the deployment.

Using available resources may include implementing components and tools already acquired and in proximity to the deployment.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include deployment 100. Deployment 100 may include Internet of Things (IoT) devices 100A-100N.

An IoT device may be a device that collects data about the outside world, processes it using logic or computation internal to the device, and sends the data through the Internet and/or a network to an end user or another device. Because IoT devices can record observable data from the outside world, process it, and send the data through a network, IoT devices may be usable for a variety of different uses.

IoT devices 100A-100N may include one or more sensors or other types of data collection devices (while described below with respect to sensors, it will be appreciated that any type of data collection device may be used). There may be no limit to the number of data collection devices and sensors that may be incorporated in an IoT device. As there may be no limit to the incorporation of data collection devices and sensors, IoT devices may not be limited in how much data collection may take place about the outside world. Therefore, the type and amount of data that may be collected by an IoT device may only be limited to the type and number of data collection devices and sensors that may be incorporated to an IoT device. With the increasing number and type of data collection devices and sensors that may be affixed to an IoT device, the amount and type of data that an IoT device may collect may increase as well.

IoT devices may include data processing tools for data that may be collected. Once data may be collected by one or more sensors that may be incorporated to an IoT device, one or more data processing tools may also be incorporated with an IoT device. With one or more data processing tools that may be incorporated with an IoT device, there may be no limit to the number and type of data processing tools that may be incorporated with an IoT device. As there may be no limit to the number and type of data processing tools that may be incorporated with an IoT device, there may be no limit to the quantity data and types of data that may be processed by an IoT device. With the increasing number of data processing tools that may be incorporated to an IoT device, the potential for data processing by an IoT device may increase as well.

Connection of an IoT device to the Internet and/or a network may augment ease of use for an end user as well. An IoT device may operate remotely with respect to an end user. In operating remotely with respect to an end user, an end user may not need to be in local proximity with an IoT device. An end user may not need to be in local proximity to an IoT device because the IoT device may be designed to operate independently of the end user. In operating independently of an end user, the IoT device may be designed with and execute logic that permits autonomous behavior. The logic that may permit autonomous behavior may permit utilization of any sensors or devices that may affixed to the IoT device without end user intervention. The logic that may permit autonomous behavior may also extend to execution of data processing tools upon reception of data from the sensors or devices. Once the data processing tools complete processing of data from the sensors or devices, the IoT device may send the data to the end user through the Internet and/or a network. In sending and presenting data to an end user through the Internet and/or a network, the end user may not be required to be located proximate to the IoT device. In not being required to be located proximate to the IoT device, as long as the end user maintains a connection to the Internet and/or a network at their current location, the end user may be located anywhere. Therefore, on the condition than an end user may maintain a connection to the Internet and/or a network, an IoT device may augment ease of use for an end user.

As mentioned, an IoT device may incorporate logic that may permit autonomous behavior in processing data. In permitting autonomous behavior, an IoT device may not require intervention by an end user. An IoT device may not require intervention by an end user because it may be designed to record data from the outside world, process the data with any data processing tools that may be incorporated within the IoT device, and send the data through the Internet and/or a network. In being tasked with accomplishing these steps, it may be designed to accomplish these steps without human intervention. It may be designed to accomplish these steps without human intervention because an IoT device may be designed with logic that facilitates automation of these steps.

With these features of an IoT device, the applications for an IoT device may be many. The set of applications for which one or more IoT devices may facilitate services may include consumer, commercial, industrial, and infrastructure arenas.

IoT devices may have applications in the consumer arena. The consumer arena may include applications such as connected vehicles, home automation, wearable technology, connected health, and appliances. These applications may function with an IoT device with connection to the Internet and/or a network. Appliances within a home, for example, may be controlled or automated through a cellular phone that may be connected to a local area network. Assuming these appliances may also be connected to the local area network, the end user may execute tasks such as activating or deactivating one or more ceiling fans, ceiling lights, security cameras throughout the home. More interestingly, the end user may execute tasks such as activating or deactivating the air conditioner, television or any vehicles outside the home, and even opening or closing the garage door or any security gates on the property.

IoT devices may also have roles within the commercial arena. Concerning medical applications, IoT devices in this realm may be referred to as "Internet of Medical Things" (IoMT) devices. These devices may be worn by patients that collect data and send the data to medical professionals to make diagnoses and monitor patients. Such devices may include wearable heart monitors, blood pressure monitors, and glucose monitors. Not only may medical professionals utilize these devices to monitor patients, but guardians may be permitted to access end user data of a patient in order to aid care of the patient for which they may be responsible. Even while in proximity to the patient, guardians may receive data about the patient through their cellular phone to facilitate monitoring duties. Vehicles may be another commercial application for IoT devices. Such examples may include reception of traffic information and downloading of software updates for operating systems that drivers may use to interface with vehicle settings. Additionally, IoT devices in vehicles may govern other software that monitors for lane departure, driving speed, and braking behavior to qualify driving behavior. Further, vehicles requiring maintenance may be connected to a network at vehicle maintenance center. Using a network connection at a vehicle maintenance center, data from the vehicle may be uploaded to a remote network and be processed to determine parts of the vehicle that may need refinement or replacement.

IoT devices may have roles within the industrial arena. For example, IoT devices may be used for manufacturing applications. Examples of this may include monitoring of process control, operator tools, and service information systems to augment safety and security. IoT devices may be used to predict malfunctions by monitoring temperature, vibrations, voltage, and current in machinery. Further, IoT devices may be affixed to autonomous machinery to remove time-consuming and heavy human labor work. IoT devices may also be used in agriculture applications. Specifically in farming, IoT devices may be used to collect measurements of temperature, rainfall, humidity, wind speed, and soil content. IoT devices may use this data to automate autonomous farming machinery. Farmers may also utilize IoT devices to remotely monitor livestock, crops, and equipment. Data from monitoring may be used to forecast livestock behavior, crop yield, and equipment maintenance.

IoT devices may have roles within the infrastructure arena. Specifically in the infrastructure arena may be the advent of the smart city. Smart cities may use IoT devices that may be connected to a city-wide network to improve infrastructure, public utilities, and services. For example, IoT devices may be attached to buildings that track energy consumption. IoT devices may also be used in a city-wide network of sensors and cameras that monitor and collect data on weather, traffic, and pollution. Also, IoT devices may be used to collect data related to public transportation systems to optimize efficiency. Pollution may be monitored by IoT devices, to assess air quality of a city. Population density within a section of a city, specifically pedestrian traffic along sidewalks and vehicular traffic along roads and freeways, may also be measured using IoT devices, to assess which sections are more congested as various times within the day. The applications of IoT devices in the infrastructure arena may be still growing, especially toward the development of the smart city.

Within the numerous applications of IoT devices, despite the autonomous behavior of IoT devices, the IoT devices may be subject to failure in time. In time, with continued use of an IoT device, one or more IoT device that may be connected within deployment 100 may fail to function. In failing to function, one or more IoT devices may need refinement or replacement. Refinement or replacement may require human intervention. As refinement or replacement may require human intervention, the remote use of deployment 100 may break down. In the remote use of deployment 100 breaking down, human intervention, the role of which may be fulfilled by an end user or administrator, may require local activity by the end user or administrator. In requiring local activity by the end user of administrator, deployment 100 may not be employed over the Internet and/or a network, as described by communication system 104.

In general, embodiments disclosed here relate to methods and systems for remediating impaired devices. Impaired devices may experience a failure in operation. The failure in operation may adversely affect or inhibit the cooperative process. To improve the cooperative process so that an impaired device may exhibit normal operation, the impaired device may need to be remediated.

Consideration for the remediation of an impaired device may include whether to repair or replace the impaired device. Whether to repair, replace, and/or approximate the device may depend on the integrated costs of the device. Integrated costs of the device may include for the combined effects of operational and performance costs. Apart from the operational and performance costs each, the combined effects may outweigh the separate costs. If the combined effects may outweigh the separate costs, the device may need to be replaced. Otherwise, the device may suffice to be repaired and/or approximated.

To provide the above noted functionality, the system may include deployment 100, which may include IoT device 100A-100N, and failure aggregator 102. Also, the system may include communication system 104 and requesting device 106. Each of the components is discussed below.

To provide identification and either remediation and/or replacement of IoT device 100A-100N, failure aggregator 102A may be introduced within deployment 100. Failure aggregator 102A may serve to catalogue notices of failure of operation by IoT device 100A-100N. In addition to the presence of failure aggregator 102A, logic within IoT device 100A-100N may be augmented to send notices of failure of operation by IoT device 100A-100N to failure aggregator 102A. By cataloguing notices of failure of operation, failure aggregator 102A may serve to notify other devices within IoT device 100A-100N of proximal IoT devices that may fail to operate. As an example, IoT device 100A may be connected to IoT device 100B, which may be connected to IoT device 100C. IoT device 100B may fail to operate but still be active. As a result of its failure, IoT device 100B may send notice of failure of operation to failure aggregator 102A. At some point before or during operation of deployment 100, failure aggregator 102A may send the notice of failure of operation to IoT device 100A and IoT device 100C. In receiving notice of failure of operation concerning IoT device 100B, IoT device 100A and IoT device 100C may note that IoT device 100B may fail to operate. Further, as a failure to operate may exist for IoT device 100B, IoT device 100A and IoT device 100C may not execute operations along the pathway with IoT device 100B. Due to the failure to operate for IoT device 100B, they may execute operations on another set of IoT devices 100A-100N that do not include IoT device 100B. As a result for the failure to operate for IoT device 100B, failure aggregator 102A may also call for non-human remediation that may include running diagnostics or altering logic within IoT device 100B. Further, failure aggregator 102A may also call for replacement of IoT device 100B by non-human means, such as a utilization of a drone that might manually remove and affix a new IoT device 100B.

Inherent in the replacement of IoT device 100B may be consideration or remediation. Either remediation or replacement may be considered. In considering remediation or replacement, operational costs and performance costs may be considered. Operational costs may include the retail costs and/or maintenance costs of the device and/or the energy costs to run the device. Performance costs may include effects of the output of the impaired device on other devices along the pathway of devices. If the sum of the operational costs and performance costs may outweigh the cost of replacement of the device, then IoT device 100B may be replaced. Otherwise, IoT device 100B may be repaired and/or approximated.

With the introduction and utilization of failure aggregator 102A, deployment 100 may further remove the necessity of human intervention if one or more of IoT device 100A-100N may fail in deployment 100. In removing the necessity of human intervention in deployment 100, any human, be it as an end user or administrator, may be solely operate requesting device 106. Although requesting device 106 may be operated by an end user or administrator, requesting device 106 may also be a device that behaves autonomously. In either case, failure aggregator 102A may remove the possibility of human intervention operating in local proximity of deployment 100.

Thus, as identified in FIG. 1, a system in accordance with an embodiment may identify deployment 100 including IoT device 100A-100N and failure aggregator 102A. Failure aggregator 102A may catalogue notices of failure of operation by IoT device 100A-100N. In cataloguing notices of failure of operation, deployment 100 may not execute any of pathway including IoT device 100A-100N that have failures of operation. Further, failure aggregator 102A may direct the remediation and/or replacement of any IoT device 100A-100N that fail to operate. In these ways, failure aggregator 102A may maintain the integrity of data transmission over communication system 104 and weaken the necessity of intervention of any entity, human or not, that may operate requesting device 106. Refer to FIGS. 2A-2G and 3A-3D for additional details regarding the operation of failure aggregator 102 and IoT devices 100A-100N.

Figure 3A:
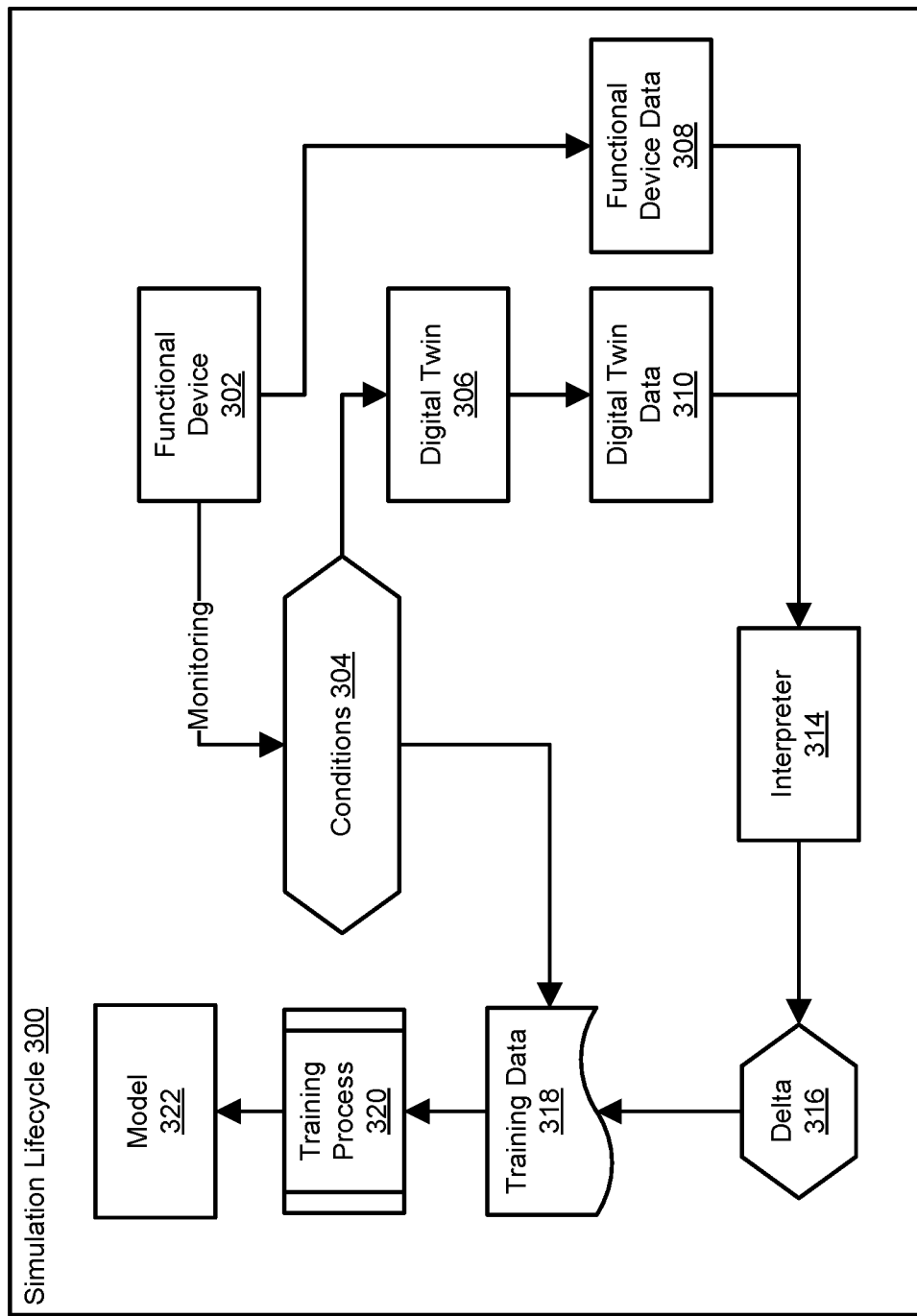
FIG. 3A shows an eighth data flow diagram illustrating operation of a portion of a system in accordance with an embodiment.
Figure 3B:
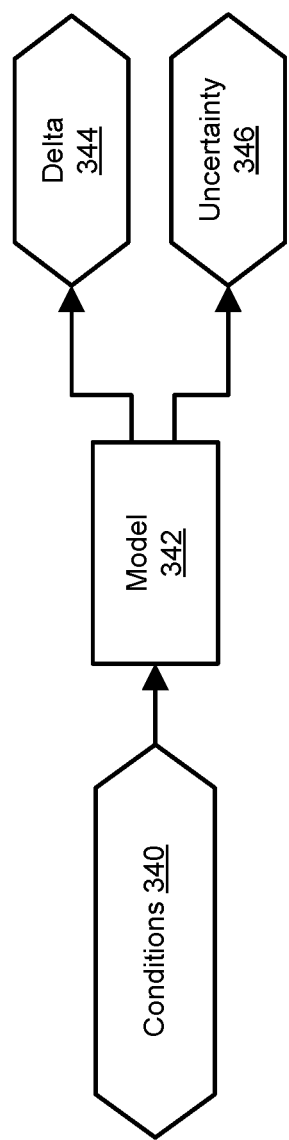
FIG. 3B shows a ninth data flow diagram illustrating operation of a portion of a system in accordance with an embodiment.

While providing their functionalities, any of IoT devices 100A-100N and/or failure aggregator 102 may perform all, or a portion, of the methods shown in FIG. 3A-3B.

Any of (and/or components thereof) deployment 100, requesting device 106, and/or other components may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Figure 2B:
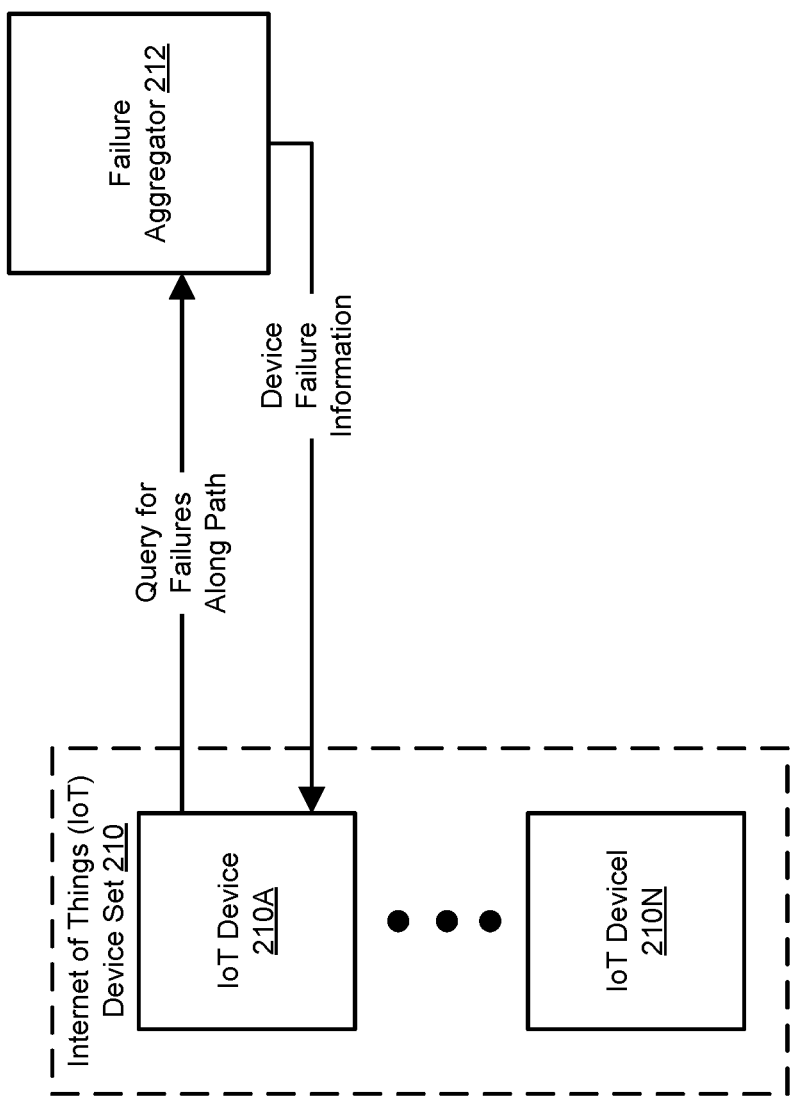
FIG. 2B shows a second data flow diagram illustrating operation of a portion of a system in accordance with an embodiment.
Figure 2C:
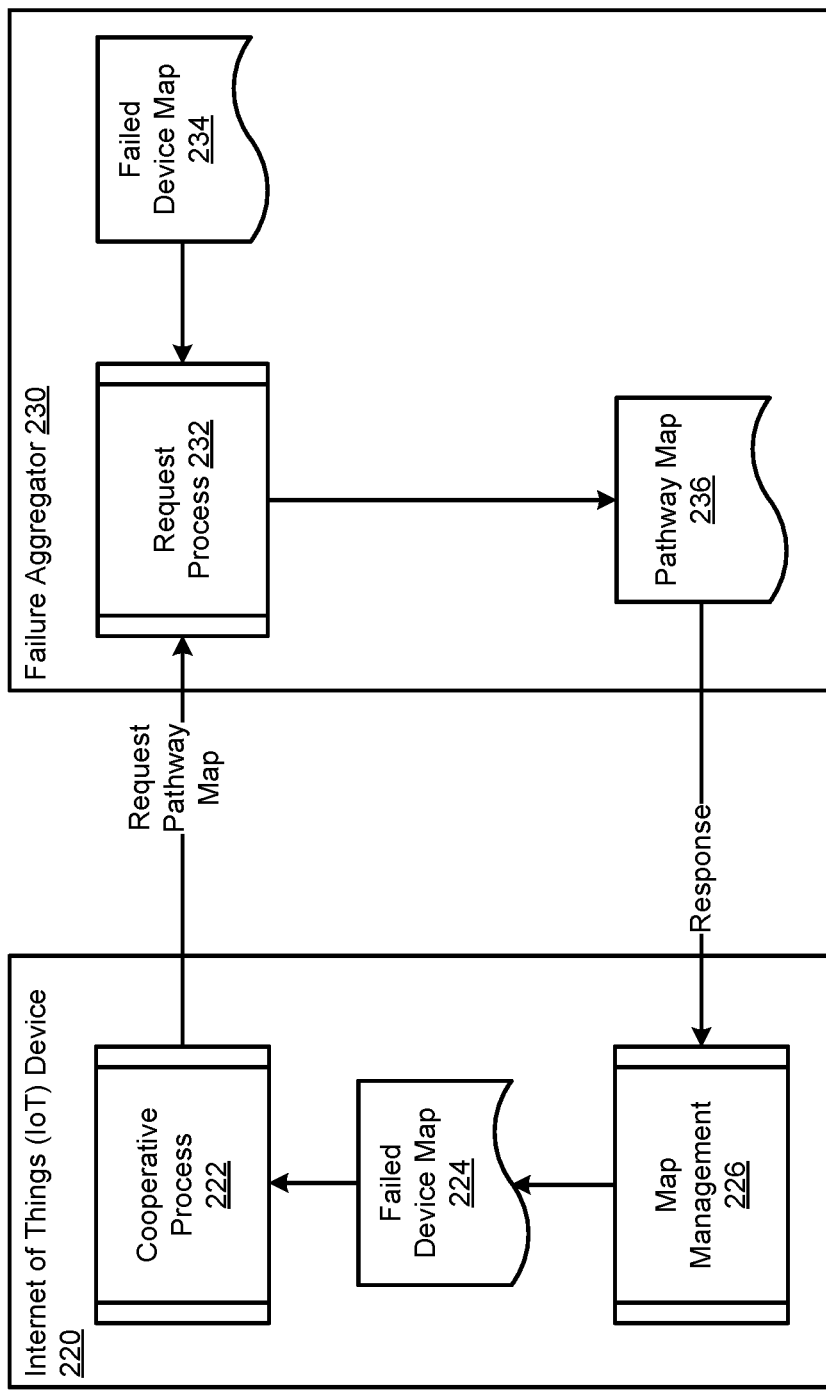
FIG. 2C shows a third data flow diagram illustrating operation of a portion of a system in accordance with an embodiment.
Figure 2D:
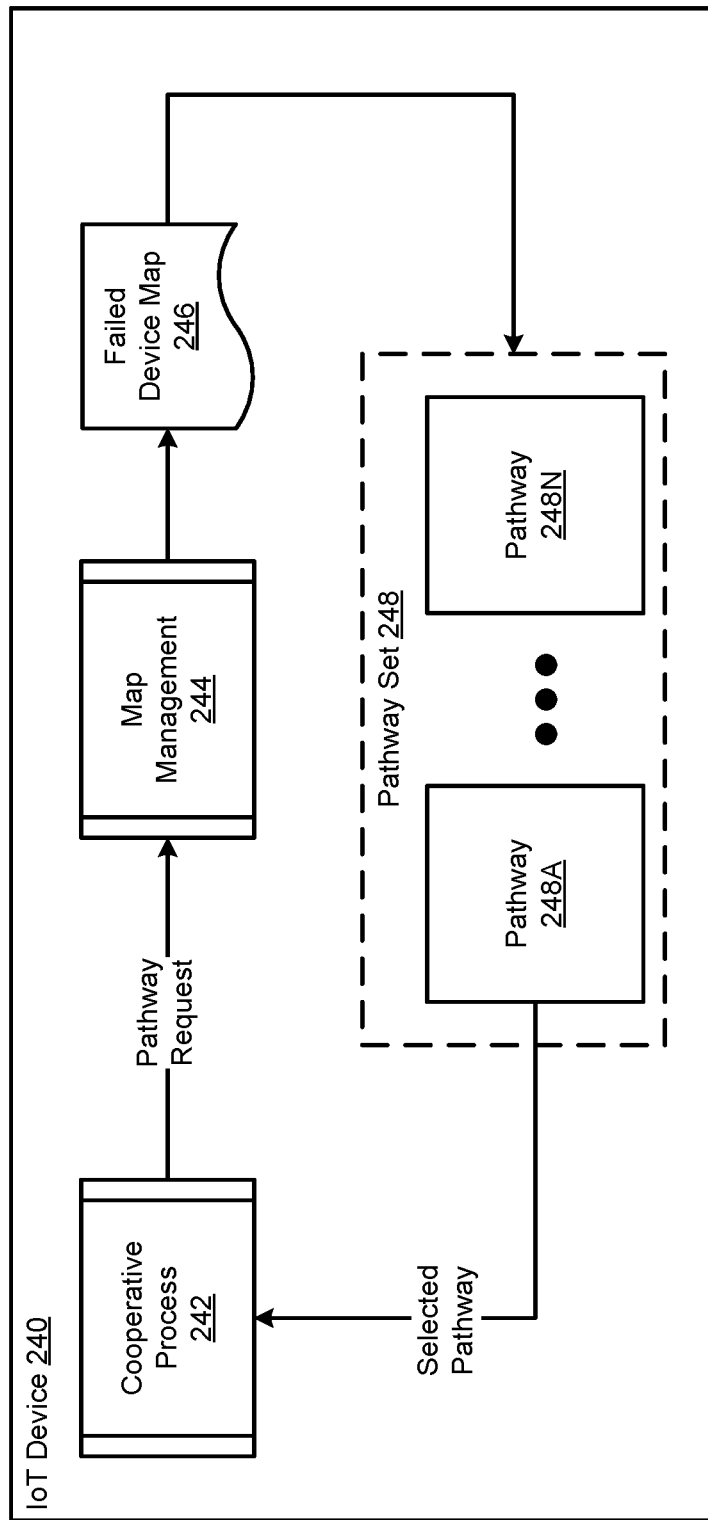
FIG. 2D shows a fourth data flow diagram illustrating operation of a portion of a system in accordance with an embodiment.
Figure 2E:
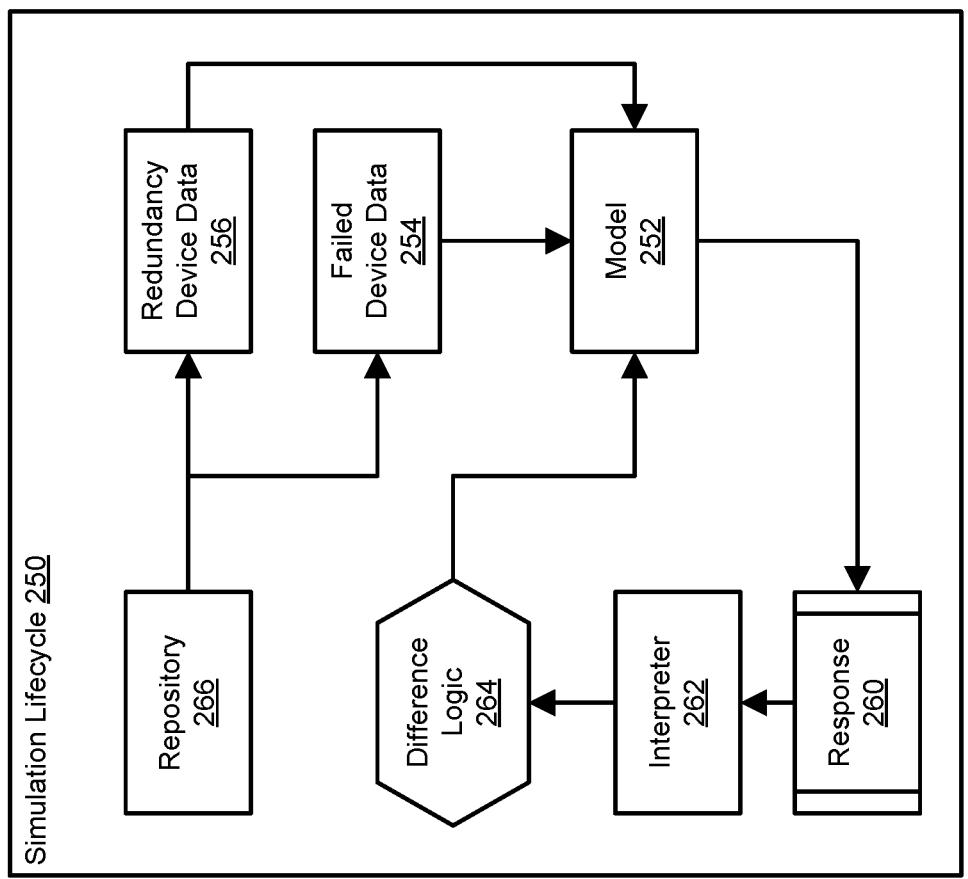
FIG. 2E shows a fifth data flow diagram illustrating operation of a portion of a system in accordance with an embodiment.
Figure 2F:
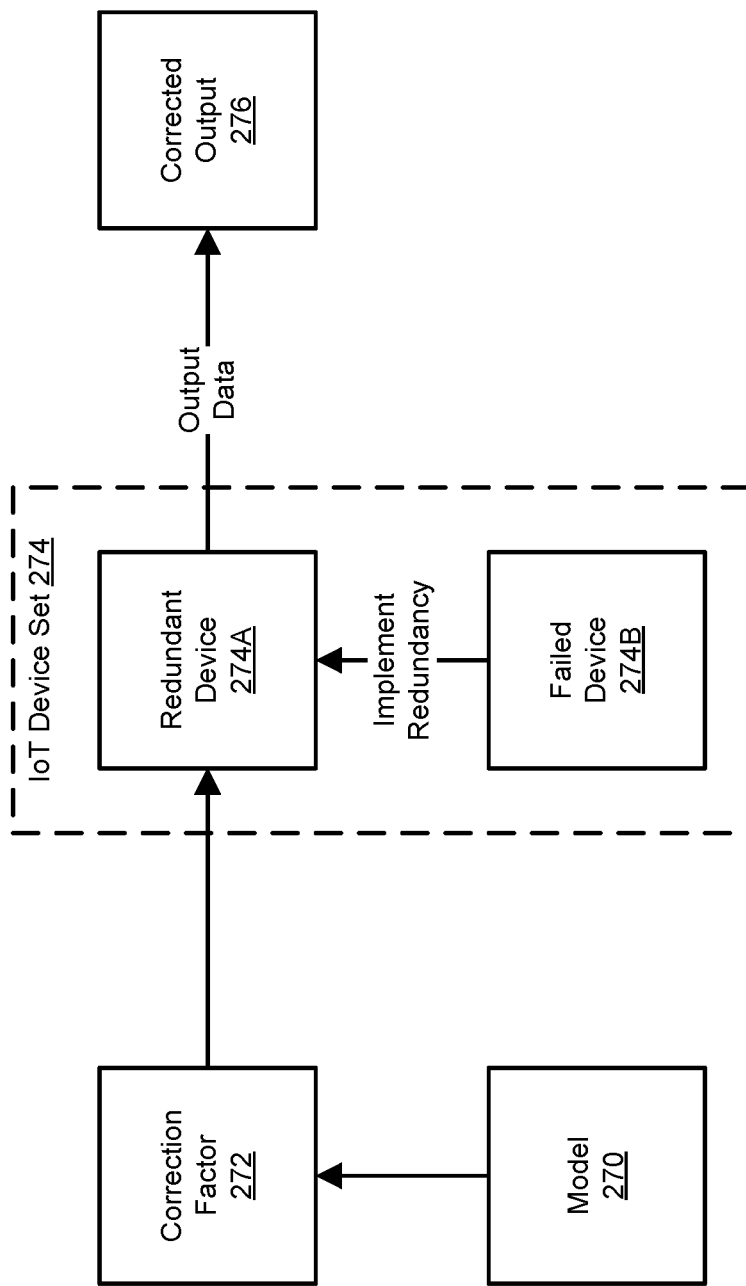
FIG. 2F shows a sixth data flow diagram illustrating operation of a portion of a system in accordance with an embodiment.
Figure 2G:
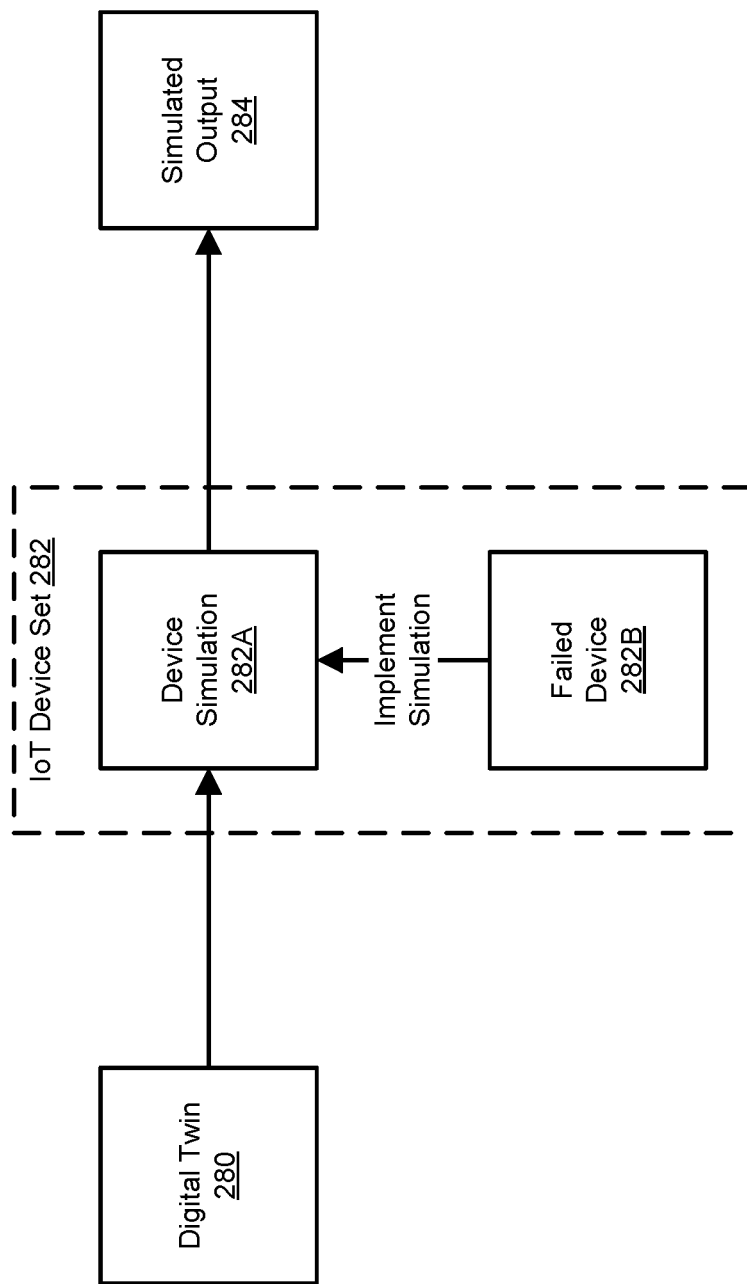
FIG. 2G shows a seventh data flow diagram illustrating operation of a portion of a system in accordance with an embodiment.
Figure 3C:
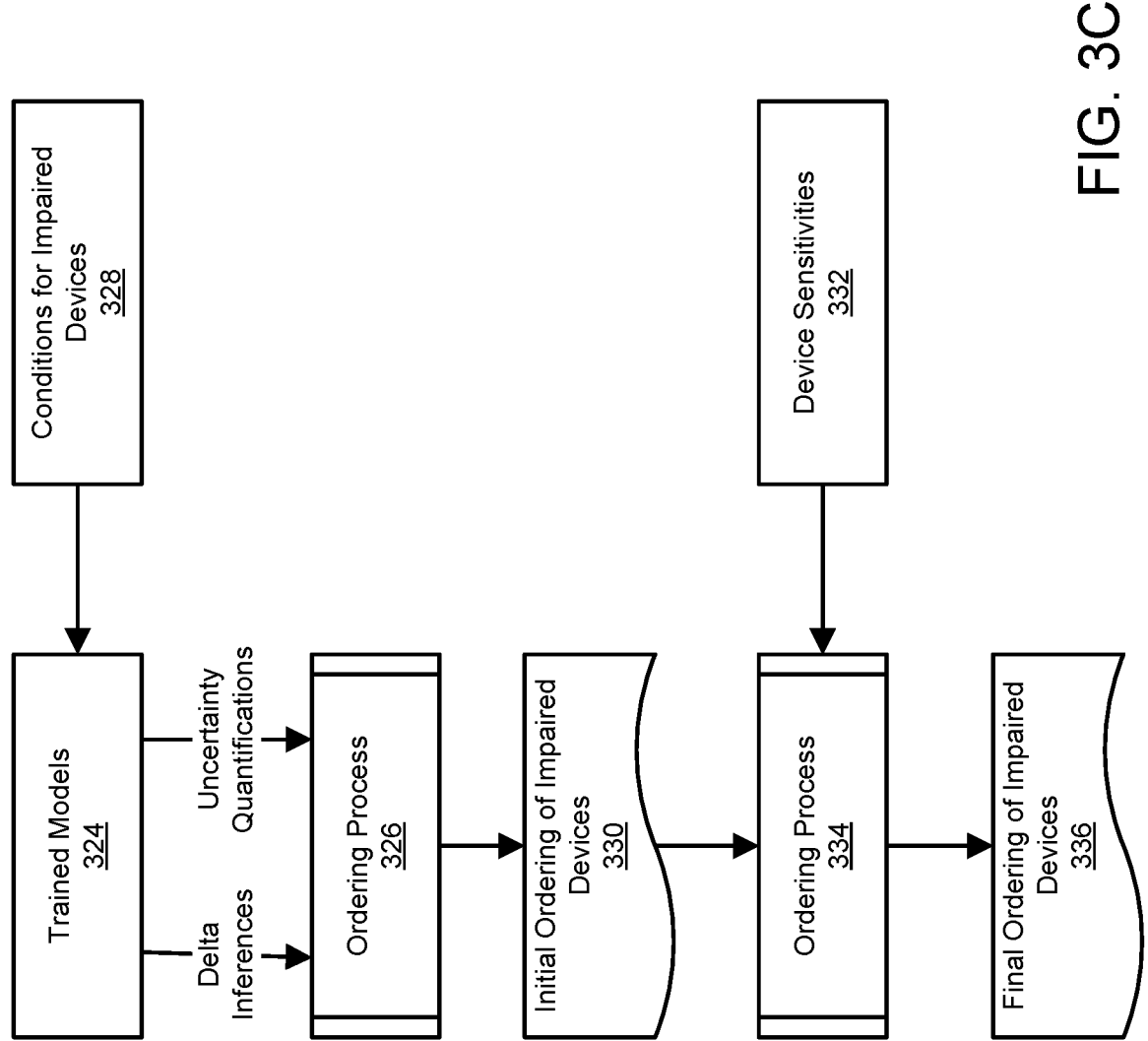
FIG. 3C shows a tenth data flow diagram illustrating operation of a portion of a system in accordance with an embodiment.
Figure 3D:
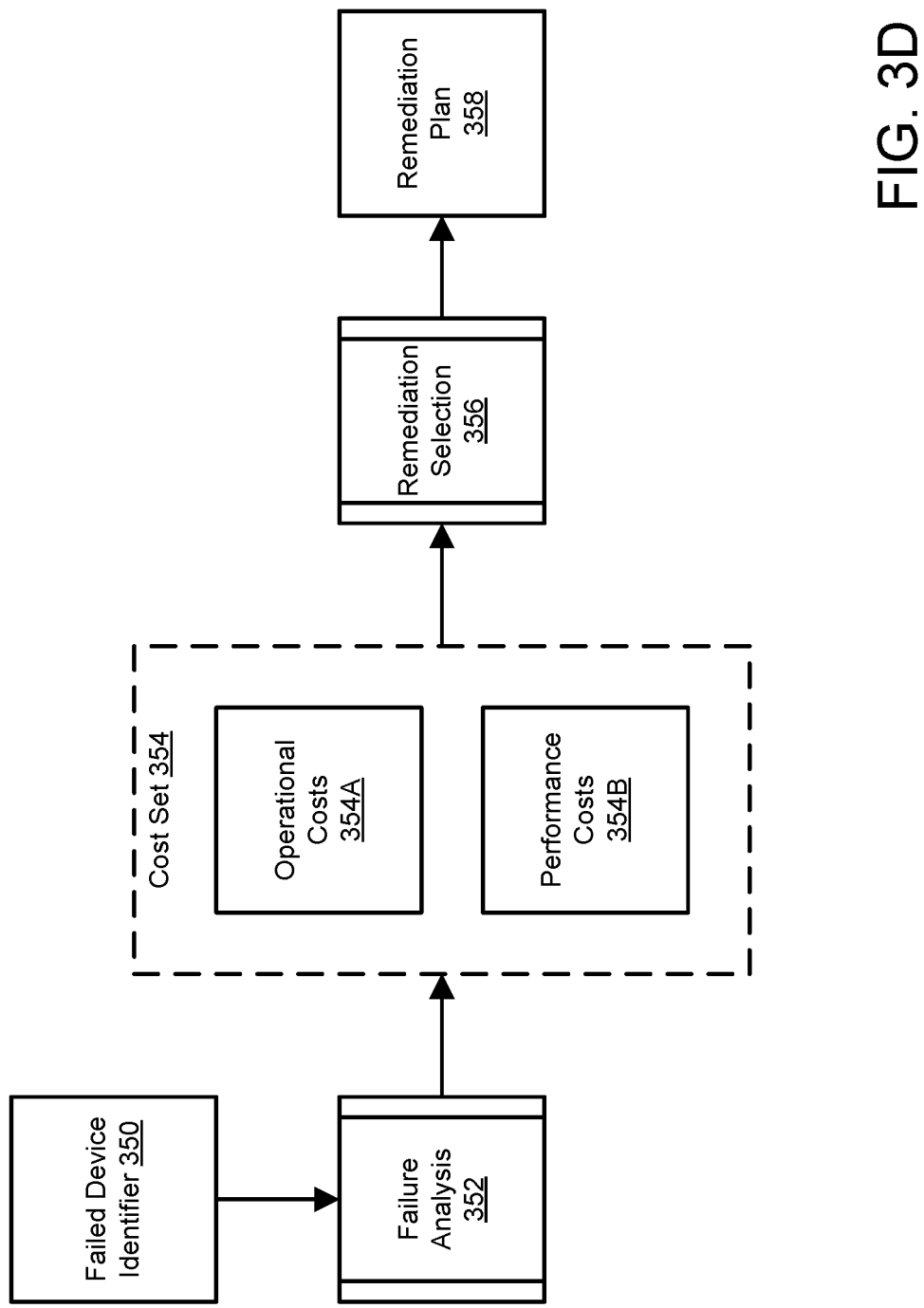
FIG. 3D shows an eleventh data flow diagram illustrating operation of a portion of a system in accordance with an embodiment.

To further clarify embodiments disclosed herein, data flow diagrams are shown in FIGS. 2A-2G and 3A-3D. These data flow diagrams show flows of data that may be implemented by the system of FIG. 1. In FIG. 2A, the transfer of device failure information from failure aggregator 200 to IoT device set 202 is illustrated. In FIG. 2B, the transfer of device failure information is illustrated based on a query from IoT device 210A. In FIG. 2C, the transfer of device failure information may be further illustrated as a request for a pathway map from failure aggregator 230. In FIG. 2D, implementation of the pathway map and selection of a pathway in IoT device 240 is illustrated. In FIG. 2E, implementation of a simulation cycle of the development of a machine learning model is illustrated. In FIG. 2F, implementation of a correction factor is illustrated. In FIG. 2G, implementation of a digital twin is illustrated. In FIG. 3A, training of a machine learning model for functional device is illustrated. In FIG. 3B, application of a trained machine learning model is illustrated. In FIG. 3C, the ordering of failed devices is illustrated. In FIG. 3D, determination of failure of a device towards remediation is illustrated.

Turning to FIG. 2A, a data flow diagram illustrating transferring of device failure information in accordance with an embodiment is shown. When prompted by the deployment, similar to deployment 100 in FIG. 1, failure aggregator 200 may push a network map of functional devices that may include devices from IoT device 202A-202N. Functional devices may be expected to perform cooperative processes. A cooperative process may be a process in a set of devices that act in a cooperative manner along a pathway in the network map to perform a process. A pathway may link a set of devices along which information may be passed between devices through a cooperative process. All the pathways through which devices may perform cooperative process may be diagrammed by the pathway map, or network map. If received before or during operation of deployment 100, the network map may be used by IoT device 202A-202N that avoid devices that may be encumbered by failures of operation. In avoiding devices that may be encumbered by failures of operation, pathways may be selected that may comprise of IoT device 202A-202N that may not have failures of operation. In selecting pathways comprised of IoT device 202A-202N that may not have failures of operation, deployment 100 may operate overall without failure.

Failure aggregator 200 may implemented using functionality to catalogue information regarding notices of failure of operation. In cataloguing notices of failure of operation, failure aggregator 200 may use these notices to generate a network map of functional devices among IoT device 202A-202N. In generating a network map of functional devices, failure aggregator 200 may advise IoT device 202A-202N within the deployment to select a pathway on the network map that uses functional devices among IoT device 202A-202N. By advising IoT device 202A-202N within the deployment, failure aggregator 200 may maintain the fidelity of the deployment as it operates using IoT device 202A-202N.

As an example of the push function of failure aggregator 200, there may be a house equipped with a camera system. On every door and side of the house, there may be a camera. For each camera, there may be a device connected that provides notification to the end user if a human may be identified by the camera. Each camera may then be connected to a human identification device that may be connected to the wireless network in the house. Within the camera system, a set of pathways may exist in which photographic data may be generated by camera and may be passed to a human identification device, which may process the data and may pass it to the wireless network. Within each pathway, cooperative processes may be run between the camera, the human identification device, and the wireless network. Using the wireless network, the owner of the house may use their cellular phone, which may have software for the camera system, to receive notifications from and access the camera system. The camera system may include failure aggregator 200. It may be that however frequently per day, the end user has set failure aggregator 200 to push notification to each set of devices a network map of functional devices. The network map may use notices of failure from failure aggregator 200 to shut down a human identification device of camera.

IoT device set 202 may be implemented using a set of devices that may include IoT device 202A-202N. The set of devices may be connected in a linear or non-linear arrangement. In being connected, IoT device set 202 may be illustrated with a network map that may be generated by failure aggregator 200. The network map may relate connectivity of IoT device set 202. Therefore, the network map may illustrate all the pathways specific to IoT device set 202 along which cooperative processes may be performed.

IoT devices 202A-202N may be implemented using a set of devices of IoT device set 202. Each device within IoT devices 202A-202N may include (i) sensors that collect or measure observable information from the real-world and/or (ii) data processing tools that either processes data for use by another device or post-processes data in a human-readable format. In post-processing data in a human-readable format, the device may send the data through the Internet and/or a network, like communication system 104 in FIG. 1. In sending data through the Internet and/or the network, the data may be made available to a human-interfacing device, similar to requesting device 106 in FIG. 1.

Continuing with the example of the camera system, the camera system may have multiple pathways. Each pathway may include a camera somewhere on the outside of a house, followed by a human-identification device. For each pathway, each human-identification device may connect to the cellular phone of the owner of the house. Each human-identification device may include software that sends data over the wireless network in the house to the cellular phone of the owner of the house. In sending data to the cellular phone to the owner of the house, the data may be in a human-readable format that conveys confirmation that a human may be identified in the view of one or more cameras.

Thus, in FIG. 2A, a diagram illustrating the transfer of device failure information in accordance with an embodiment is shown. Failure aggregator 200 may push device failure information to each device within IoT device 202A-202N. In pushing device failure information, IoT device 202A-202N may operate using device pathways that may not include devices that may fail to operate.

In addition to pushing device failure information by the failure aggregator to the set of devices within a deployment, devices within a deployment may also query for device failure information from the failure aggregator. In querying for device failure information, a device may know whether other devices along a pathway may experience a failure to operate. In knowing whether other devices may experience a failure to operate, the device may determine whether performance of a cooperative process along the pathway may be possible.

Turning to FIG. 2B, a diagram illustrating querying for failures of operation along the path of IoT device 210A and subsequent transfer of device failure information in accordance with an embodiment is shown. During operation of the deployment which may include IoT device set 210, IoT device 210A may query for failures of operation along its path. In order to ascertain failures of operation along its path, IoT device 210A may query failure aggregator 212, which may be similar to failure aggregator 200 in FIG. 2A. As a result of the query by IoT device 210A, failure aggregator 212 may return device failure information to IoT device 210A. In the return, failure aggregator 212 may yield information of failures of operation along the path in which IoT device 210A operates. In ascertaining failures of operation along its path, IoT device 210A may utilize contingency logic if it becomes aware that subsequent devices along its path may fail to operate.

IoT device set 210 may be implemented using a set of devices that may include IoT device 202A-202N.

Using the example of the camera system from FIG. 2A, the camera system may have multiple pathways. Each pathway may include a camera somewhere on the outside of a house, followed by a human-identification device. For each pathway, each human-identification device may connect to the cellular phone of the owner of the house. Each human-identification device may include software that sends data over the wireless network in the house to the cellular phone of the owner of the house. A camera at some point may query failure aggregator 212 for failures of operation along the path, from the camera, through the human identification device, to the network. Failure aggregator 212 may return with a failure to operate from the human identification device along the same path. As a result of the failure to operate from the human identification device, the camera may run contingency logic. Contingency logic run by the camera may include shutting down the camera or sending an error message to the end user through another pathway from the camera to the network.

Failure aggregator 212 may be implemented using a device that catalogues information regarding notices of failure of operation. In cataloguing notices of failure of operation, failure aggregator 212 may use these notices to generate a network map of functional devices among IoT device 210A-210N. In generating a network map of functional devices, failure aggregator 212 may advise IoT device 210A-210N within the deployment to select a pathway on the network map that uses functional devices among IoT device 210A-210N. By advising IoT device 210A-210N within the deployment, failure aggregator 212 may maintain the fidelity of the deployment as it operates using IoT device 210A-210N.

Continuing with the example of the camera system of FIG. 2A, failure aggregator 212 may have received a notice of failure of operation from one of the human identification devices. Failure aggregator 212 may use this failure of operation to generate a network map of the camera system. Further, it may send this information as a network map to the devices within the camera system. The network map of the devices may be sent from the camera system using a push function, as described in FIG. 2A. In addition, upon reception of a query for failures from a device, failure aggregator 212 may send device failure information concerning the path on the network map on which the device operates.

Thus, as shown in FIG. 2B, a diagram illustrating a query for failures of operation along the path of IoT device 210A and subsequent transfer of device failure information in accordance with an embodiment is shown. IoT device 210A may query failure aggregator 212 for failures of operation of devices along its path. As a result, failure aggregator 212 may send device failure information of devices along the path of IoT device 210A from the network map. In reception of device failure information of devices along the path of IoT device 210A, IoT device 210A may operate with contingency logic to maintain operation of the deployment that utilizes IoT device set 210.

In requesting device failure information, a device may request a pathway map from the failure aggregator. The failure aggregator may respond accordingly so that the device may implement the pathway map for other cooperative processes in the deployment.

Turning to FIG. 2C, a data flow diagram illustrating a process for requesting for a pathway map in accordance with an embodiment is shown. IoT device 220 may include cooperative process 222 that may utilize incoming or outgoing data. In utilizing incoming or outgoing data, it may utilize data processing tools to perform tasks used in the function of IoT device 220.

Included in the performance of tasks, cooperative process 222 may initiate a request for the pathway map (the pathway map is discussed below in greater detail) of the deployment in which IoT device 220 may be implemented. To initiate a request for the pathway map, cooperative process 222 may send the request to request process 232 within failure aggregator 230. Request process 232 may receive the request. Request process 232 may note the sender of the request. In noting the signature of the request, request process 232 may query failed device map 234. In querying failed device map 234, request process 232 may retrieve all data of failed device map 234 pertinent to IoT device 220. In retrieving all data of failed device map 234 pertinent to IoT device 220, request process 232 may construct pathway map 236 that may include pathways relevant to IoT device 220. Relevant pathways for IoT device 220 may include all other devices with which IoT device 220 may perform cooperative processes. Pathway map 236 may illustrate all pathways through which IoT device 220 may be connected to other devices.

With pathway map 236 constructed, failure aggregator 230 may respond to IoT device 220 with pathways relevant to IoT device 220. Map management 226 in IoT device 220 may receive pathway map 236. In receiving pathway map 236, map management 226 may not only store pathway map 236, but it may also isolate failed device map 224 from pathway map 236. Failed device map 224 may be isolated from pathway map 236 by cataloguing pathways in which cooperative processes may not be run due to devices with a failure to operate. Through use of failed device map 224, IoT device 220 may learn which devices, along similar pathways as IoT device 220, may have failures of operation. In knowing which devices may have failures of operation, cooperative process 222 may know to not attempt execution of processes with known devices that may have failures of operation. In knowing devices that may have failures of operation, cooperative process 222 may redirect execution of processes to devices along connecting pathways that may not have failures of operation.

IoT device 220 may be implemented using a device, similar to any devices within IoT device 210A-210N included within IoT device set 210 in FIG. 2B.

Cooperative process 222 may be implemented using a process that implements logic using data that may be outgoing to and/or incoming from other IoT devices or failure aggregator 230. In processing outgoing and/or incoming data, cooperative process 222 may be involved in communication between other devices. In communicating with other devices, cooperative process 222 may be equipped to implement contingency logic when connected devices experience failures of operation.

Using the example of the camera system from FIG. 2A, cooperative process 222 may be implemented in all the devices of the camera system. In a camera, cooperative process 222 may process and send photographic data to a human-identification device. In a human-identification device, cooperative process 222 may receive photographic data, implement logic to discern human forms with photographic data, and may send those human forms in a human-readable format to the cellular phone of an end user. Further, cooperative process 222 may process connected pathways between devices within the camera system. In processing pathways within the camera system, it may implement logic to request a pathway map from failure aggregator 230. In requesting a pathway map from failure aggregator 230, cooperative process 222 may query request process 232.

Failure aggregator 230 may be implemented using a device that catalogues information regarding notices of failure of operation. In cataloguing notices of failure of operation, failure aggregator 230 may use these notices to generate a network map of functional devices among IoT device 210A-210N from FIG. 2B and IoT device 220. In generating a network map of functional devices, failure aggregator 230 may advise IoT device 210A-210N from FIG. 2B and IoT device 220 within the deployment to select a pathway on the network map that uses functional devices among IoT device 210A-210N from FIG. 2B and IoT device 220. By advising the IoT device 210A-210N from FIG. 2B and IoT device 220 within the deployment, failure aggregator 230 may maintain the fidelity of the deployment as it operates using IoT device 210A-210N from FIG. 2B and IoT device 220.

Request process 232 may be implemented using a process that may receive queries for pathway maps from devices in the deployment. In receiving queries for pathway maps, request process 232 may be equipped to identify the sender of the request. Using identification of the sender, request process 232 may call failed device map 234, which may entail all devices having failures of operation that may share pathways with IoT device 220.

Continuing with the example of the camera system, request process 232 may have received a request for pathway map from cooperative process 222 within IoT device 220, which may be either from a camera or human identification device. Whichever type of device, camera or human identification device, may have sent the query, request process 232 may retrieve failed device map 234 from its catalogue of failed devices. The catalogue of failed devices may include connected cameras or human identification devices. Using the catalogue of failed devices, from which failed device map 234 may be constructed, request process 232 may construct pathway map 236.

Failed device map 234 may be implemented using a data structure which catalogues information on devices that fail to operate. In cataloguing information on devices that fail to operate, failed device map 234 may be hosted by a device, including failure aggregator 230. In being hosted by failure aggregator 230, a query may be sent to failure aggregator 230 to request information on devices that fail to operate.

Continuing with the example of the camera system, request process 232 may have received a request for pathway map from cooperative process 222 within IoT device 220. To fulfill this request, request process may retrieve failed device map 234, which may include catalogued information on devices connected to IoT device 220 that may fail to operate. The catalogued information from failed device map 234 may be used to generate pathway map 236.

Pathway map 236 may be implemented using a data structure which illustrated the pathways relevant to IoT device 220 that may not fail to operate. In illustrating pathways that may not fail to operate, pathway map 236 may be used to direct a device by illustrating functional pathways on which to execute operations. In illustrating functional pathways on which to execute operations, pathway map 236 may be utilized by IoT device 220 specifically with map management 226.

Continuing with the example of the camera system, request process 232 may have received a request for pathway map from cooperative process 222 within IoT device 220. Request process 232 may utilize failed device map 234 to construct pathway map 236. With pathway map 236, failure aggregator 230 may generated all functional pathways applicable in the camera system specifically for IoT device 220.

Map management 226 may be implemented using a process which may ingest pathway map 236. Through ingestion of pathway map 236, map management 226 may have the functionality to process all functional pathways applicable to IoT device 220. In being able to process all functional pathways applicable to IoT device 220, map management 226 may be tasked with directing cooperative process 222 by isolating IoT devices along similar pathways to IoT devices 220 that may fail to operate.

Continuing with the example of the camera system, IoT device 220 may have received pathway map 236 from failure aggregator 230. In receiving pathway map 236, map management 226 may have ingested pathway map 236. Either device type, be it a camera or human identification device, may include map management 226 within its functionality. Map management 226 may utilize pathway map 236 to generate failed device map 224. Failed device map 224 may include a catalogue of all devices within the camera system along similar pathways as IoT device 220 that may have failure of operation.

Failed device map 224 may be implemented using a data structure which catalogues information on devices that fail to operate. Failed device map 224 may be similar to failed device map 234. In cataloguing information on devices that fail to operate, failed device map 224 may be housed within a device, including failure aggregator 230. In being housed within any device, failed device map 224 may be used to direct cooperative process 222 by regulating to which devices with which not to expect functionality, to which not to expect incoming data and to which not to send outgoing data.

Continuing with the example of the camera system, failed device map 224 may include a catalogue of all devices that may have failures of operation within the camera system. Cooperative process 222 may ingest failed device map 224, thereby allowing failed device map 224 to direct its processes. Failed device map 224 may direct cooperative process 222 to not work with or expect incoming or outgoing data from cameras or human identification devices which may have failures of operation.

Thus, in FIG. 2C, a diagram illustrating a request for a pathway map in accordance with an embodiment is shown. Cooperative process 222 from IoT device 220 may request the pathway map. Failure aggregator 230 may generate pathway map 236 from failed device map 234, which may be a catalogue of devices which may have failures of operation. Pathway map 236 may be passed to map management 226 in IoT device 220. Map management 226 may generate failed device map 224, which may be a catalogue of devices which may have failures of operation. Failed device map 224 may be used to direct processes on cooperative process 222.

Turning to FIG. 2D, a data flow diagram illustrating selection of a pathway in IoT device 240 in accordance with an embodiment is shown. The pathway may be selected based on information obtained through the flows shown in FIGS. 2B and/or 2C, and to ensure successful completion of cooperative process 242 even when some devices of a deployment that may otherwise participate in cooperative process 242 have failed. Cooperative process 242 may cause IoT device 240 to perform one or more actions cooperatively with other devices to complete a cooperative process. The one or more actions may include sending data to other devices and obtaining data from other devices. The other devices may be selected on the basis of a selected pathway. Cooperative process 242 may involve selection of a pathway on which no connected devices have failures of operation. In selecting a pathway on which no devices have failures of operation, cooperative process 242 may utilize a pathway. In utilizing a pathway, map management 244 may recall failed device map 246. In recalling failed device map 246, map management 244 may begin with a catalogued information of devices that may fail to operate. FIG. 2C may illustrate ingestion of failed device map 224 by cooperative process 222. As failed device map 224 from FIG. 2C may be similar to failed device map 246 in FIG. 2D, and as cooperative process 222 from FIG. 2C may be similar to cooperative process 242, it may be expected that failed device map 246 may be ingested by cooperative process 242. However, cooperative process 242 may utilize failed device map 246 to generate pathway set 248, which includes all the possible pathways, pathway 248A-248N, connected through cooperative process 242. From pathway 248A-248N, cooperative process 242 may require an appropriate pathway, pathway 248A, through which to accept incoming data, process it, and send as outgoing data.

IoT device 240 may be implemented using a device, similar to IoT device set 220 in FIG. 2C. Internet and/or a network Cooperative process 222 may be implemented using a process that implements logic using data that may be outgoing or incoming from other IoT devices or failure aggregator 230 in FIG. 2C. In processing outgoing or incoming data, cooperative process 222 may be involved in communication between other devices. In communicating with other devices, cooperative process 222 may be equipped to implement contingency logic when connected devices experience failures of operation.

Using the example of the camera system from FIG. 2A, cooperative process 242 may be implemented in all the devices of the camera system. In a camera, cooperative process 242 may process and send photographic data to a human-identification device. In a human-identification device, cooperative process 242 may receive photographic data, implement logic to discern human forms with photographic data, and/or may send those human forms in a human-readable format to the cellular phone of an end user. Further, cooperative process 242 may process connected pathways between devices within the camera system. In processing pathways within the camera system, it may implement logic to request a pathway from map management 244.

Map management 244 may be implemented using a process which may ingest pathway map 236 from FIG. 2C. Through ingestion of pathway map 236, map management 244 may have the functionality to process all functional pathways applicable to IoT device 240. In being able to process all functional pathways applicable to IoT device 240, map management 244 may be tasked with directing cooperative process 242 by isolating IoT devices along similar pathways to IoT devices 240 that may fail to operate, as illustrated in FIG. 2C. Map management 244 may also store and recall failed device map 246 as directed by cooperative process 242, as illustrated in FIG. 2D.

Continuing with the example of the camera system from FIG. 2A, cooperative process 242 may have requested a pathway along which data may be processed and for operations to proceed. The request for the pathway may have been received by map management 244. In reception of the request of a pathway, map management 244 may recall failed device map 246.

Failed device map 246 may be implemented using a data structure which catalogues information on devices that fail to operate. Failed device map 246 may be similar to failed device map 224. In cataloguing information on devices that fail to operate, failed device map 246 may be housed within a device, including IoT device 240. In being housed within any device, failed device map 246 may be used to direct cooperative process 222 by regulating to which devices with which not to expect functionality, to which not to expect incoming data and to which not to send outgoing data. Failed device map 246 may also be recalled from map management 244 for the development of pathway set 248 to aid in the regulation of cooperative process 242.

Continuing with the example of the camera system from FIG. 2A, cooperative process 242 may have requested a pathway along which data may be processed and for operations to proceed. Failed device map 246 may have been recalled from storage on map management 244. In being recalled from storage, failed device map 246 may be ingested by cooperative process 242, which may develop pathway set 248 from failed device map 246. In developing pathway set 248, cooperative process 242 may select pathway 248A from pathway set 248 along which operations of cooperative process 242 may proceed.

Pathway set 248 may be implemented using a set of pathways. The set of pathways may be generated from failed device map 246. In generating pathways from failed device map 246, pathway set 248 may not be comprised of devices that have failures of operation.

Pathway 248A-248N may comprise the set of pathways from pathway set 248. In comprising the set of pathways from pathway set 248, pathway 248A-248N may not be comprised of devices that have failures of operation. In not being comprised of devices that have failures of operation, pathway 248A-248N may utilize devices that promote operation and processing of data by cooperative process 242.

Continuing with the example of the camera system from FIG. 2A, cooperative process 242 may have requested a pathway along which data may be processed for operations to proceed. Using failed device map 246, cooperative process 242 may have generated pathway set 248. From pathway set 248, cooperative process 242 may choose an optimal pathway, pathway 248A, along which to process and send outgoing photographic data. For the camera system, a camera may choose pathway 248A that bypasses human identification devices that have failures of operation. If all human identification devices in the camera system have failures of operation, then pathway 248A may entail sending raw photographic data or an error message directly to the cellular phone of an end user.

Thus, as shown in FIG. 2D, a diagram illustrating selection of a pathway in IoT device 240 in accordance with an embodiment is shown. Cooperative process 242 may request a pathway from map management 244. As a result, map management 244 may recall failed device map 246 from storage. Pathway set 248 may be generated from failed device map 246 by cooperative process 242. From pathway set 248, the optimal pathway, pathway 248A, may be selected by cooperative process 242 along which to process data and proceed with operations.

As an alternative to bypassing a failed device with a failure of operation by pathway selection, a machine learning model may be developed. The machine learning model may be developed to learn the differences between the failed device and a redundant device that may exist within the deployment.

Turning to FIG. 2E, a diagram illustrating simulation lifecycle 250 in accordance with an embodiment is shown. In simulation lifecycle 250, model 252 may be developed. In development of model 252, redundancy device data 256 and failed device data 254 may be taken from repository 266. Taken from repository 266, failed device data 254 and redundancy device data 256 may be absorbed by model 252. Failed device data 254 may be data taken from a device that may have been previously operational but may currently have a failure to operate. Additionally, redundancy device data 256 may be data taken from a device that may be currently operational and may operate similarly but not exactly as the failed device.

Upon absorbing failed device data 254 and redundancy device data 256, model 252 may give response 260. Response 260 may include differences in the data between failed device data 254 and redundancy device data 256. The differences in the data may be absorbed by interpreter 262. Interpreter 262 may generate difference logic 264. Difference logic 264 may include programmatic logic that may be necessary to add to the device from which redundancy device data 256 originated match failed device data 254 from the failed device.

Difference logic 264 may be absorbed by model 252. In absorbing difference logic 264, model 252 may begin to learn what logic may be required by the redundant device that produced redundancy device data 256 to produce failed device data 254.

To train model 252, simulation lifecycle 250 may be iterated through numerous cycles. In iterating simulation lifecycle 250 through numerous cycles, model 252 may continue to absorb failed device data 254 and redundancy device data 256, both of which may be called from repository 266. In more cycles of absorbing failed device data 254 and redundancy device data 256, difference logic 264 may continue to develop. In developing difference logic 264, model 252 may learn from development of difference logic 264. In learning development of difference logic 264, model 252 may be trained to develop programmatic logic for all variations of differences between failed device data 254 and redundancy device data 256. In developing programmatic logic for all variations of differences, model 252 may sufficiently modify redundant device, the source of redundancy device data 256, so that the redundant device may be able to produce failed device data 254.

Simulation lifecycle 250 may be a process which may govern the development of model 252. In governing the development of model 252, simulation lifecycle 250 may include configuration settings of the machine learning process. Configuration setting of the machine learning process may include the split ratio for training and testing with data, learning rate, optimization algorithm, loss function, and the number of epochs.

Model 252 may be implemented using an inference model. An inference model may be implemented using a machine learning model, a decision tree, naïve bayes model, linear or logistic regression model, kNN model, k-means model, random forest model, and/or support vector machines model.

The machine learning model may be a neural network. The neural network may be trained using supervised learning, unsupervised learning, semi-supervised learning, or reinforcement learning. The learning process for model 252 may entail development of programmatic logic based on input of two different qualities of data sets.

Continuing with the example of the camera system from FIG. 2A, it may pass that a camera may be connected to a human identification device. It may also pass that a generic identification device may be operationally connected to the camera. This generic identification device may be similar to the human identification device in that it may be configured to recognize moving entities in photographic data from the camera. However, the generic identification device may not be configured to identify humans. To serve as a redundant device in case of a failure to operate by the human identification device, the generic identification device may need to be trained for human identification. Model 252 may be trained using data generated from the human identification device and from the generic identification device.

Repository 266 may be implemented using one or more data structures. The data structure may include one or more volumes of data for redundancy device data 256 and failed device data 254. Redundancy device data 256 and failed device data 254 may be formatted specifically for input into model 252.

Continuing with the example of the camera system from FIG. 2A, repository 266 may include output data for the set of cameras and human identification devices in the camera system. The output data, redundancy device data 256 and failed device data 254, may have been generated at manufacture or setup of the camera system. Upon failure of operation by a device, this redundancy device data 256 and failed device data 254 may be utilized in training model 252.

Failed device data 254 may be implemented as a data structure that may include data from a device that may be expected to experience a failure to operate. In anticipation for a failure to operate, failed device data 254 may be generated. With generation of failed device data 254, data from the failed device, rather than the failed device itself, may be utilized to train model 252.

Continuing with the example of the camera system from FIG. 2A, a generic identification device may have been installed to serve as a redundancy for a human identification device. In addition, a data set may have been generated with the human identification device and stored within the deployment. The data set may serve as failed device data 254. Failed device data 254 may be called from storage and used in training model 252. In addition, model 252 may also require a data set, redundancy device data 256, that may have been generated with the generic identification device and stored within the development.

Redundancy device data 256 may be implemented as a data structure that may include data from another device. This device may serve as a redundancy for a device that may experience a failure to operate. In anticipation for training model 252, redundancy device data 256 may be generated. With generation of redundancy device data 256, data from the redundant device, rather than the redundant device itself, may be utilized to train model 252.

Continuing with the example of the camera system from FIG. 2A, a generic identification device may have been installed to serve as a redundancy for a human identification device. The human identification device may experience a failure to operate, and thus may be inoperable. Despite the inoperability of the human identification device, failed device data 254 may be called from storage. Also, redundancy device data 256 may also be called from storage. Having called both data sets from storage, model 252 may begin training by assessing the differences in both data sets.

Response 260 may be implemented using one or more data structures which note the differences in failed device data 254 and redundancy device data 256. In noting the differences in both data sets, model 252 may distinguish between both data sets.

Continuing with the example of the camera system from FIG. 2A, failed device data 254 from the human identification device and redundancy device data 256 from the generic identification device may be digested by model 252. In digesting both data sets, model 252 may observe differences between both data sets. Using the differences, interpreter 262 may seek to understand the differences in both data sets.

Interpreter 262 may be implemented using a one or more processes which digests response 260. In digesting response 260, interpreter may seek to understand the programmatic logic which may yield response 260. In seeking to understand the programmatic logic, interpreter 262 may develop difference logic 264, which may be the source of differences between both data sets.

Continuing with the example of the camera system from FIG. 2A, interpreter 262 may read the differences in data sets from the human identification device and generic identification device. In reading the differences in data sets, interpreter 262 may develop the programmatic logic that may govern the differences in data sets. The programmatic logic that may govern the differences in data sets may be difference logic 264.

Difference logic 264 may be implemented using one or more data structures which note the source of differences between failed device data 254 and redundancy device data 256. The source of differences may include programmatic logic from which model 252 may absorb in its training in simulation lifecycle 250. In absorbing difference logic 264, model 252 may begin to learn what programmatic logic governs the differences in failed device data 254 and redundancy device data 256.

Continuing with the example of the camera system from FIG. 2A, interpreter 262 may yield difference logic 264. Difference logic 264 may include programmatic logic which governs the differences in data sets from the human identification device and the generic identification device. Difference logic 264 may be passed to model 252, which may begin to learn how to develop programmatic logic to replace the human identification device with the generic identification device. In replacing the human identification device, model 252 may be trained to correct the generic identification device to behave exactly like the human identification device.

Thus, as shown in FIG. 2E, a diagram illustrating simulation lifecycle 250 in accordance with an embodiment is shown. Simulation lifecycle 250 may govern training of model 252. Model 252 may be trained to correct the function of a redundant device so that it may behave exactly like a failed device. Model 252 may be trained by learning the differences in data from both devices. In learning the differences in data from both devices, model 252 may learn the difference in programmatic logic between both devices. In learning the difference in programmatic logic, model 252 may provide corrective logic to the redundant device to make it behave exactly as the failed device.

The machine learning model that may have been developed using the failed device and the redundant device may be used to correct for output from the failed device. The machine learning model may be correct for output from the failed device by applying a correction factor to the output of the failed device. Application of the correction factor may yield corrected output from the failed device.

Turning to FIG. 2F, a diagram illustrating implementation of a correction factor in accordance with an embodiment is shown. Model 270 may have been trained, as shown in FIG. 2E, using data from failed device 274B and redundant device 274A. After having been trained with both data sets, model 270 may generate correction factor 272. Model 270 may generate correction factor 272 to be applied to redundant device 274A upon implementation of redundant device 274A in place of failed device 274B. Upon implementation, redundant device 274A may execute functionality in place of failed device 274B. Correction factor 272 may be applied to redundant device 274A while in place of failed device 274B so that redundant device 274A may produce corrected output 276. Corrected output 276 may be output from redundant device 274A that would be similar output from failed device 274B, if failed device 274B may not have experienced a failure to operate.

Model 270 may be implemented using an inference model. An inference model may be implemented using a machine learning model, a decision tree, naïve bayes model, linear or logistic regression model, kNN model, k-means model, random forest model, and/or support vector machines model.

The machine learning model may be a neural network. The neural network may be trained using supervised learning, unsupervised learning, semi-supervised learning, or reinforcement learning. The learning process for model 270 may entail development of programmatic logic based on input of two different qualities of data sets.

Continuing with the example of the camera system from FIG. 2A, it may pass that a camera may be connected to a human identification device. It may also pass that a generic identification device may be operationally connected to the camera. This generic identification device may be similar to the human identification device in that it may be configured to recognize moving entities in photographic data from the camera. However, the generic identification device may not be configured to identify humans. To serve as a redundant device in case of a failure to operate by the human identification device, the generic identification device may need to be trained for human identification. Model 252 may be trained using data generated from the human identification device and from the generic identification device.

Correction factor 272 may be implemented as a data structure that may have been generated by model 270. Generation of correction factor 272 by model 270 may have been initiated using data sets from redundant device 274A and failed device 274B. Through use of data sets from redundant device 274A and failed device 274B, correction factor 272 may be applied to redundant device 274A to correct functionality so that output from redundant device 274A may match output from failed device 274B.

Continuing with the example of the camera system from FIG. 2A, model 252 may have been trained using data generated from the human identification device and from the generic identification device. The human identification device may have experienced a failure of operation and the generic identification device may have been implemented as a redundant device. To implement the generic identification device in place of the human identification device and produce data as might be expected from the human identification device, correction factor 272 may be applied to the generic identification device.

IoT device set 274 may include the set of devices in consideration. The set of devices in consideration may include redundant device 274A and failed device 274B. Given correction factor 272, redundant device 274A may be implemented in place of failed device 24B.

Failed device 274B may be implemented as a device which may experience a failure to operate. In experiencing a failure to operate, failed device 274B may require replacement. To suffice for a replacement, redundant device 274A may be considered.

Continuing with the example of the camera system from FIG. 2A, the human identification device may have experienced a failure to operate. In experiencing a failure to operate, the human identification device may require replacement. To suffice for a replacement, the generic identification device may be considered.

Redundant device 274A may be implemented as a device to replace failed device 274B. To replace failed device 274B, redundant device 274A may require correction to its functionality. To correct for functionality of redundant device A, correction factor 272 may be applied.

Continuing with the example of the camera system from FIG. 2A, the generic identification device may be considered as a replacement for the human identification device. To replace the human identification device, the generic identification device may require correction to its functionality. To correct for functionality of the generic identification device, correction factor 272 may be applied.

Corrected output 276 may be implemented as a data structure that included the output of redundant device 274A. The output of redundant device 274A may match output that failed device 274B may output if failed device 274B may not experience a failure to operate. Because failed device 274B may experience a failure to operate, redundant device 274A may become responsible for outputting data as corrected output 276.

Continuing with the example of the camera system from FIG. 2A, the generic identification device may replace the human identification device. In replacing the human identification device, the generic identification device may output data that may match the human identification device. By producing data that may match that from the human identification device, the generic identification device may output corrected output 276.

Thus, as shown in FIG. 2F, a diagram illustrating implementation of correction factor 272 in accordance with an embodiment is shown. Implementation of correction factor with redundant device 274A may result in corrected output 276. In generating corrected output 276, redundant device 274A may output data that matches output from failed device 274B when it may not experience a failure to operate.

In the event that the deployment may not be equipped with a machine learning model from which to generate a correction factor and/or may be unable to use a correction factor to establish replacements for failed devices in cooperatively performed processes, the deployment may be equipped with a digital twin. The digital twin may functionality to simulate option of one or more devices. With the functionality to simulate one or more devices, the digital twin may be employed to simulate a device during a failure to operate.

Turning to FIG. 2G, a diagram illustrating implementation of digital twin 280 in accordance with an embodiment is shown. Implementation of a redundant device in the event of a failure of operation of another device may not be possible. Implementation of a redundant device may not be possible because redundant devices may not exist within the deployment. In this case, the failure aggregator may be equipped with a digital twin. The digital twin may be equipped to simulate one or more devices within the deployment. Therefore, in the event of a failure of operation by a device, operation within the deployment may be rerouted from the device with a failure of operation to the digital twin. The digital twin may simulate operation of the failed device and output data along the corresponding pathway.

Digital twin 280 may be implemented as a process. The process may contain software to simulate processes in place of one or more devices in the deployment. The software may be employed when one or more of the devices experience a failure of operation.

Continuing with the example of the camera system from FIG. 2A, it may pass that a camera may be connected to a human identification device. It may also be that the camera system may include a digital twin within the failure aggregator. The digital twin may contain software for the human identification device. Upon failure of the human identification device, operations from a camera may be rerouted to the digital twin, which may run software in place of the failed human identification device.

IoT device set 282 may include the set of devices in consideration. The set of devices in consideration may include failed device 282B and device simulation 282A. When failed device 282B cannot maintain operations due to a failure of operation, device simulation 282A may be prompted to simulate operations expected of failed device 282B.

Failed device 282B may be implemented as a device which may experience a failure to operate. In experiencing a failure to operate, failed device 282B may require simulation of operations. To execute simulation of operations expected from failed device 282B, device simulation 282A from digital twin 280 may be implemented.

Continuing with the example of the camera system from FIG. 2A, the human identification device may have experienced a failure to operate. In experiencing a failure to operate, operations from human identification device may be simulated by digital twin 280. Using digital twin 280, device simulation 282A may pass.

Device simulation 282A may be implemented as a process. The process may be implemented using digital twin 280. Digital twin 280, by executing device simulation 282A, may simulate operations of failed device 282B.

Continuing with the example of the camera system from FIG. 2A, the human identification device may have experienced a failure to operate. To maintain operations by the camera system, the digital twin may implement software to simulate operations of the human identification device. In simulating operations of the human identification device, device simulation 282A may yield simulated output 284 in place of expected output from failed device 282B.

Simulated output 284 may be implemented as a data structure. The data structure may include output data from device simulation 282A. The output data from device simulation 282A may be similar to expected data from failed device 282B under normal operation.

Continuing with the example of the camera system from FIG. 2A, the human identification device may have experienced a failure to operate. The digital twin from the failure aggregator may have executed a simulation of the human identification device to output data. The output data may be similar to the expected output data from the human identification device under normal operation.

Thus, as shown in FIG. 2G, a diagram illustrating implementation of digital twin 280 in accordance with an embodiment is shown. In the event that a device has failed, the digital twin may be used to simulate operations of the device. In simulating operations of the device, output data may be generated that would be similar to expected output from the failed device on normal operation. In generating output through device simulation 282A, normal operation of the deployment may be maintained.

Not only may the digital twin be used in simulating a device, but a digital twin may participate in training of a machine learning model. The machine learning model may be used to understand differences in operation between the digital twin and a functional device. Differences in operation may exist because the digital twin may not duplicate output that may also be generated from the functional device. Such differences may indicate deterioration in the condition of the functional device. The inferred deterioration of device may be used to prioritize use of limited resources for healing of the devices.

Turning to FIG. 3A, a diagram illustrating training of a machine learning model for functional device 302 in accordance with an embodiment is shown. Functional device 302 may be a device along a pathway in a development. The development may include digital twin 306 which may comprise simulations of all the devices within the development. The development may include machine learning models to be trained for each functional device 302 within the development.

Model 322 may be a machine learning model to be trained for functional device 302. As digital twin 306 may include functionality to simulate functional device 302, digital twin 306 may not simulate functional device 302 exactly. In not simulating functional device 302 exactly, digital twin 306 may generate digital twin data 310 which may not be duplicative of functional device data 308 from functional device 302. As digital twin 310 may not be duplicative of functional device data 308, a difference between both data sets may exist. The difference between both data sets may be delta 316.

To train model 322, functional device 302 may be considered first. Conditions 304 may include settings that may have been absorbed by functional device 302 along the pathway in the development in which functional device 302 may exist. Execution of functional device 302 with conditions 304 may cause generation of functional device data 308. Likewise, conditions 304 may also be absorbed into digital twin 306. Execution of digital twin 306 with conditions 304 may cause generation of digital twin data 310.

Digital twin data 310 and functional device data 308 may be absorbed by interpreter 314, which may parse differences in both data sets. In parsing differences in both data sets, interpreter 314 may catalogue differences in data sets generated from digital twin 306 and functional device 302. Through cataloguing the differences in data sets, interpreter 314 may yield delta 316. Delta 316 may include the catalogue of differences between digital twin data 310 and functional device data 308.

The association of conditions 304 and delta 316 may be used as training data 318. For example, conditions 304 may be an independent variable (e.g., features used as input to a machine learning model) and delta 316 may be the corresponding dependent variable. Both variables with this association may be introduced to training process 320. Training process 320 may regulate the learning procedure between conditions 304 and delta 316. The results of the learning procedure may be absorbed by model 322.

As governed by simulation lifecycle 300, the process for FIG. 3A may be iterated. In iterating the process, conditions 304 may be an independent variable and delta 316 may be a dependent variable. Through iteration of the process, conditions 304 may be varied, which may result in different values for delta 316. As conditions 304 and delta 316 may vary, training data 318 may vary. As training data 318 may vary, the results of training process 320 may vary, and therefore model 322 may absorb varying results. In absorbing varying results, model 322 may develop associations between conditions 304 and delta 316. Thus, model 322 may ultimately learn to predict delta 316 upon input of conditions 304 for functional device 302.

Functional device 302 may be implemented as a device among one of many devices within the development. As one of many devices, it may exist along a pathway within the development and may be operationally connected to other devices. Being operationally connected to other devices, functional device 302 may be expected to operate normal and may absorb data from and pass data to other devices. Data that may be absorbed by the device may include conditions 304.

Continuing with the example of the camera system from FIG. 2A, it may pass that a camera may be connected to a human identification device. Both the camera and the human identification device may function as expected. In functioning as expected, the human identification device may absorb data from the camera, the data of which the human identification device may present conditions on which it is expected to operate.

Conditions 304 may be implemented as a data structure, which may be absorbed by a device. In expectation of absorption of data, functional device 302 may monitor for conditions 304. In monitoring for conditions 304, functional device 302 may require input of specific types of data in a prespecified format.

Continuing with the example of the camera system from FIG. 2A, the human identification device may require input of photographic data. Input of photographic data by the human identification device may initiate execution of processes specific to photographic data. Until input of photographic data passes, the human identification device may monitor for photographic data and may run idle processes.

Digital twin 310 may be implemented as a process. The process may include software to simulate processes in place of one or more devices in the deployment. To simulate processes, digital twin 310 may require input of conditions 304 to initiate execution of simulation of processes.

Continuing with the example of the camera system from FIG. 2A, digital twin 306 may exist alongside a failure aggregator within the camera system. The digital twin may include software to simulate all devices within the camera system. When input conditions for a particular device may be received, digital twin 306 may execute simulation of processes related to the particular device.

Digital twin data 310 may be implemented as a data structure which may include data output from simulated processes. The simulated processes may mimic functionality from functional device 302. In mimicking functional device 302, digital twin data 310 may be similar but may not be duplicative to functional device data 308. For example, deterioration of functional device 302 may cause its operation to deviate from that normally expected that that predicted by digital twin 306. This difference may be dependent on the operating conditions to which functional device 302 is exposed.

Continuing with the example of the camera system from FIG. 2A, digital twin 310 may receive photographic data from a camera. Upon receiving photographic data, digital twin 310 may execute processes similar to the human identification device. After execution, the digital twin may generate data that may be similar but may not be duplicative to the human identification device.

Functional device data 308 may be implemented using a data structure which may include data output from functional device 302. As functional device 302 may experience normal operation, functional device data 308 may include data as expected from functional device 302. As functional device 302 may not include simulated processes, functional device data 308 may be similar but may not be duplicative with digital twin data 310 generated from simulated processes.

Continuing with the example of the camera system from FIG. 2A, the human identification device may hold conditions 304, which may include photographic data. The photographic data may initiate functionality to identify one or more humans within the photographic data. The identification of one or more humans may be quantified and catalogued in a pre-defined format as output data from the human identification device. The output data from the human identification device may be similar but not duplicative from a simulation of the human identification device from digital twin 306.

Interpreter 314 may be implemented using a one or more processes which may digest digital twin data 310 and functional device data 308. In digesting digital twin data 310 and functional device data 308, interpreter 314 may parse differences between both data sets. In parsing differences between both data sets, interpreter 314 may generate delta 316.

Continuing with the example of the camera system from FIG. 2A, interpreter 314 may digest output data from the human identification device and the corresponding simulation from digital twin 306. In digesting output data from both the human identification device and the corresponding simulation from digital twin 306, interpreter 314 may parse differences from both data sets. Through parsing differences from both data sets, delta 316 may be generated.

Delta 316 may be implemented using a data structure which includes the differences between digital twin data 310 and functional device data 308. The differences between both data sets may be linked to differences in functional device 302 and digital twin 306. Delta 316 may be used in combination with conditions 304 to produce training data 318.

Continuing with the example of the camera system from FIG. 2A, the differences between the human identification device and the corresponding simulation from digital twin 306 may be quantified and catalogued as delta 316. Delta 316 may exist because digital twin 306 may produce data that may be similar to but may not be duplicative of data from the human identification device. Delta 316 in combination with conditions 304 that may have been fed to functional device 302 may be used to produce training data 318.

Training data 318 may be implemented using a data structure which may associate conditions 304 with delta 316. By association, conditions 304 may be an independent variable and delta 316 may be a dependent variable. Thus, variation of conditions 304 may determine the values of delta 316.

Continuing with the example of the camera system from FIG. 2A, conditions 304 that may have been fed into the human identification device may be associated with delta 316, the differences between data output from the human identification device and the digital twin simulation. Therefore, by altering conditions 304 that are read by the human identification device, the differences in output data sets may change. The association between conditions 304 and delta 316 may be absorbed by training process 320.

Training process 320 may be implemented using a process. The process may include supervised learning, unsupervised learning, or reinforcement learning. The supervised learning process may use training data 318 in the training process.

Training data 318, which may associate conditions 304 with delta 316, may be absorbed by training process 320. In absorbing training data 318, training process 320 may undergo supervised learning. In the supervised learning process, training data 318 may be split so that some fraction may be used in training process 320 while the remaining fraction may be used test output from model 322 that may learn from training process 320.

Model 322 may be implemented using an inference model. An inference model may be implemented using a machine learning model, a decision tree, naïve bayes model, linear or logistic regression model, kNN model, k-means model, random forest model, and/or support vector machines model.

The machine learning model may be a neural network. The neural network may be trained using supervised learning, unsupervised learning, semi-supervised learning, or reinforcement learning. The learning process for model 322 may entail association of conditions 304 with delta 316 in training data 318.

Continuing with the example of the camera system from FIG. 2A, conditions 304 absorbed by the human identification device may be associated with differences between output of the human identification device and the simulation of the human identification device by digital twin 306. Model 322 may be tasked with developing relationship between association between both data sets, as conditions 304 and delta 316 may change.

Thus, as shown in FIG. 3A, a diagram concerning training of a machine learning model for functional device 302 in accordance with an embodiment is shown. Model 322 may be tasked with developing a relationship between conditions 304 and delta 316. The relationship may be used as training data 318. Training data 318 may be absorbed by the training process 320 from which model 322 may synthesize a relationship between conditions 304 and delta 316. As simulation lifecycle 300 may be iterated, varying values of conditions 304 may generate new values for delta 316. These variations may aid in developing a robust model 322.

Upon training a machine learning model using a digital twin and a functional device, the machine learning model may be able to ingest input conditions. With the ingestion of input conditions for a functional device, the machine learning model may output a prediction regarding difference in operation and an uncertainty quantification for the prediction. The difference in operation may quantify differences in output between operation of a functional device and simulation of the digital twin. The uncertainty quantification may quantify the uncertainty in the difference in operation.

Turning to FIG. 3B, a diagram illustrating application of a trained machine learning model accordance with an embodiment is shown. Conditions 340 may include input data on which a device may execute operations. Input of conditions 340 into model 342 may generate delta 344 and uncertainty 346. Delta 344 may include differences in output between the device in consideration and the simulation of the device by a digital twin in the deployment. Uncertainty 346 may include a quantified value for the trustworthiness of delta 344.

Conditions 340 may be implemented using a data structure. The data structure may include values and data sets generated from another device. The values and data sets may be input into model 342.

Continuing with the example of the camera system from FIG. 2A, a deployment may include a camera system. The camera system may include a set of cameras and a set of human identification devices. The conditions input into the cameras may include light captured from the outside world in order to generate photographic data. The conditions input into human identification devices may include photographic data in order to identify human figures on the data.

Model 342 may be implemented using an inference model. An inference model may be implemented using a machine learning model, a decision tree, naïve bayes model, linear or logistic regression model, kNN model, k-means model, random forest model, and/or support vector machines model.

The machine learning model may be a neural network. The neural network may be trained using supervised learning, unsupervised learning, semi-supervised learning, or reinforcement learning. Model 342 may ingest conditions 340. Model 342 may be similar to model 322.

Continuing with the example of the camera system from FIG. 2A, a machine learned model may exist for each camera and human identification system in the camera system in the deployment. Each model may be capable of ingesting data similar to the cameras and the human identification devices. Upon absorbing data, each model may process conditions 340 and generate delta 344 and uncertainty 346.

Delta 344 may be implemented using a data structure. The data structure may include predicted differences between the output of a device and the output of a simulation of execution of the device under conditions 340. The differences computed by model 342 may have an uncertainty quantification known as uncertainty 346.

Continuing with the example of the camera system from FIG. 2A, a camera from the deployment may absorb light from the outside world to generate photographic data. Likewise, a digital twin from the deployment may simulate operation of the camera by absorbing light from the outside work to generate photographic data. Both the camera and the digital twin may output photographic data that may have differences. Having been trained to predict differences in output, model 342 may absorb conditions 340, which may be the same quantity and arrangement of light from the outside world, and may generate delta 344. Delta 344 may be the difference in output between the camera and the digital twin. Model 342 may associate an uncertainty quantification with delta 344.

Uncertainty 346 may be implemented using a data structure. The data structure may quantify the trustworthiness of the value of delta 344. In quantifying the trustworthiness of delta 344, uncertainty 346 may validate the reliability of model 342.

Continuing with the example of the camera system from FIG. 2A, model 342 associated with a camera within the camera system may absorb conditions 340, which may include absorbing light from the outside world. Model 342 may produce delta 344 and uncertainty 346. Uncertainty 346 may include an uncertainty quantification that may quantify the reliability of delta 344. The reliability of delta 344 may be used to assess the reliability of model 342 for the camera.

Thus, as shown in FIG. 3B, a diagram illustrating application of a trained machine learning model in accordance with an embodiment is shown. The trained machine learning model, model 342, may absorb conditions 340 which may be similar to input data for a device. Model 342 may generate delta 344, which may include difference between output from the device and a simulation of the device. Delta 344 may have an uncertainty quantification associated with it called uncertainty 346. Uncertainty 346 may quantify the trustworthiness of delta 344.

Turning to FIG. 3C, a diagram illustrating the ordering of impaired devices in accordance with an embodiment is shown. The impaired devices may be placed into an ordering of impaired devices 336 via the processes shown in FIG. 3C. The ordering may be subsequently used to prioritize use of limited resources for correcting the impairments impacting the impaired device (e.g., may be a total impairment, such as a failure, or a partial impairment that has some impact on the operation of the device).

To obtain ordering of impaired devices 336, two ordering processes (e.g., 326, 334) may be performed. The first ordering process (i.e., 326) may order the impaired devices based on the severity of the impairment. The second ordering process may at least partially update the ordering based on sensitivities to impairments of the impaired devices.

During ordering process 326, conditions for impaired devices 328 may be used as input for trained models 324 (e.g., may be similar to trained models discussed with respect to FIGS. 3A-3B). The corresponding trained models may output a predicted delta for each impaired device (e.g., subject to corresponding conditions), and an uncertainty quantification for each prediction.

The impaired devices may be initially order in ordering process 326 based on the corresponding predicted deltas and uncertainty quantifications for the predictions. Generally, the impaired devices may be ordered from most impacted to least impacted based on the deltas. However, the uncertainty quantifications for the predicted deltas may be used as weights or other factors to scale the predicted deltas.

For example, consider a scenario where three impaired devices have predicted deltas of 1, 2, and 3, with corresponding uncertainties of 0.1, 0.25, and 0.1. In this scenario, numerical values for each impaired device may be calculated by multiplying the predicted deltas by the corresponding uncertainties for the predicted deltas giving corresponding numerical values of 0.1, 0.5, and 0.3, respectively. Consequently, the three devices may be initially ordered second device, third device, and first device (from highest in the hierarchy to lowest). Initial ordering of impaired devices 330 may be this ordering of the devices.

Once the initial ordering is obtained, ordering process 334 may be performed. During ordering process 334, the initial ordering may be modified based on device sensitivities 332. Devices sensitivities 332 may be quantification regarding the level of impact that impairment of the impaired devices has on cooperative processes.

Devices sensitivities 332 may be obtained, for example, through automated process that evaluate the impact of impairments of devices on cooperative processes, by subject matter experts, and/or via other process.

During ordering process 334, device sensitivities 332 may be used to scale the quantification obtained during ordering process 326 and that are used to obtain the initial ordering.

Continuing with the previous example, consider a scenario where device sensitivities ascribe a quantification to each of the three impaired devices for the impact that their impairment will have on cooperatively performed processes. In this example, the quantifications may be 3, 1, and 2, respectively. In this scenario, the previously calculated numerical values for each impaired device may be adjusted by multiplying the values (i.e., 0.1, 0.5, 0.3) by the quantifications ascribed by device sensitivities giving corresponding updated numerical values of 0.3, 0.5, and 0.6, respectively. Consequently, the three devices may be reordered third device, second device, and first device (from highest in the hierarchy to lowest). Final ordering of impaired devices 336 may be this ordering of the devices.

Thus, as shown in FIG. 3C, embodiments disclosed herein may facilitate ordering of impaired devices based on their likely level of impairment, confidence in understanding of the level of impairment, and impact on cooperatively performed processes.

Given the ordering of impaired devices, a determination may be made whether to replace or repair each impaired device. Whether to replace or repair a device may include consideration of costs for implementation of the impaired device.

Turning to FIG. 3D, a diagram illustrating a process for establishing a plan for remediating a failed device in accordance with an embodiment is shown. During the process, various costs related to failed devices may be taken into account to decide whether to repair, replace, and/or approximate a failed device. While replacing a device may be more costly than repairing it, other costs for merely repairing a device may make replacing the device a better option. The process may balance these relative costs to select a remediation plan (e.g., 348) for a failed device.

Now, consider a scenario where the system of FIG. 1 identifies an occurrence of a device failure used to perform cooperative processes with other devices. When the device fails, a failure analysis process (e.g., 342) may be performed. The process may be initiated when a failed device identifier 350 for the failed device is obtained and ingested into the process.

For example, when a device fails, an identifier for the device may be added to a queue or other data structure for subsequent processing by failure analysis 352.

Failure analysis 352 may compute cost set 354 for the device based on failed device identifier 350. Cost set 354 may include operational costs 354A and expected performance costs 354B of running the device while it may experience a failure to operate.

Once cost set 354 is obtained, remediation selection 356 may use the content of cost set 354 to obtain remediation plan 358. Remediation plan 358 specify whether the failed device is to be remediated (e.g., by assigning a technician to install new software/replace hardware, or through automated processes) or replaced the failed device with a different device (e.g., a new device as part of a refresh).

Failed device identifier 350 may be implemented using a data structure. The data structure may exist within the deployment. The data structure may identify which device may experience (or has experienced) a failure to operate (and/or an impairment in operation that may need to be resolved for continued operation).

Continuing with the example of the camera system from FIG. 2A, a deployment may include a camera system. The camera system may include a set of cameras and a set of human identification devices. One of the human identification devices may experience a failure to operate and thus may be impaired. Failed device identifier 350 may exist within the camera system to be able to identify the human identification device that may be impaired.

Failure analysis 352 may be implemented using a process. The process may be implemented by failure aggregator 102A.

Continuing with the example of the camera system from FIG. 2A, a human identification device may experience a failure to operate and thus may be impaired. Failed device identifier 350 may run failure analysis 352 on the human identification device. Failure analysis 352 may determine that there may be a bug in the software of the human identification device. The bug may have originated from a software update or attempted execution of the device with incompatible input data from a camera.

Cost set 354 may specify various types of costs related to (i) continued operation of a device (e.g., operational costs 354A) and (ii) impairment of other systems that depend on continued operation of the device (e.g., performance costs 354B).

Operational costs 354A may be implemented using a data structure. The data structure may include information regarding costs for continuing operation of the device such as: (i) the cost for repairing the device to continue its operation, (ii) the cost for energy for continued use of the device, (iii) the cost for addressing externalities for continued use of the device such as the cost for remediating an impact on the natural environment due to use of the device, (iv) the cost for purchasing a new device, and/or other costs.

Continuing with the example of the camera system from FIG. 2A, a human identification device may experience a failure to operate and thus may be impaired. Failure analysis 352 may be executed with failure aggregator 102A. Requirements of operation of the impaired human identification device may be assessed, (i) that may include costs of a new human identification device, (ii) energy requirements for continued use of the current human identification device, and (iii) cost of addressing the external impact of the human identification device on the surrounding environment or other devices, and (iv) other operational costs incurred.

Performance costs 354B may be implemented using a data structure. The data structure may include information regarding costs for continuing operation of the device based on dependence of downstream consumers (e.g. on processes performed by the device) on the device such as: (i) the cost incurred by downstream consumers for lost productivity while the device is impaired, (ii) the cost incurred by downstream consumers for use of inaccuracies in services provided by the impaired device, (iii) the cost incurred by downstream consumers for latency in ability to use the services provided by the impaired device (e.g., due to the impairment), and/or other costs placed on the downstream consumers of services/functions/etc. provided by the impaired device and due to the impairment of the device.

Continuing with the example of the camera system from FIG. 2A, a human identification device may experience a failure to operate and thus may be impaired. Failure analysis 352 may be executed using failure aggregator 102A. Requirements of performance of the impaired human identification device may be assessed. Requirements in performance of the device may include (i) cost of downstream consumption of inaccuracies made by the device or output from functional devices that use inaccurate input from the impaired human identification device, (ii) loss of productivity from the impaired human identification device, and (iii) latency effects, and (iv) other performance costs incurred.

Remediation selection 356 may be implemented using a process. The process may govern the response to impairment of a device. The response may include remediation or replacement of the device.

Continuing with the example of the camera system from FIG. 2A, a human identification device may experience a failure to operate and thus may be impaired. Operational costs 354A and performance costs 354B may be assessed in failure analysis 352. Based on operational costs 354A and performance costs 354B, remediation selection 356 may determine if either remediation or replacement of the impaired human identification device may be necessary. The determination may be stored as remediation plan 358.

Remediation plan 358 may be implemented using a data structure. The data structure may be the output of remediation selection 356. The output of remediation selection 356 may include reparation or replacement of the impaired device.

Continuing with the example of the camera system from FIG. 2A, a human identification device may experience a failure to operate and thus may be impaired. Remediation selection 356 may output remediation plan 358, based on criteria using operational costs 354A and performance costs 354B. Remediation plan 358 may include either reparation including device fixes and software updates or replacement of the impaired human identification device with a similar device without impairment.

Thus, as shown in FIG. 3D, a diagram illustrating determination of failure of a device towards remediation in accordance with an embodiment is shown. Failed device identifier 350 may execute failure analysis 352, which may assess cost set 354 consisting of operational costs 354A and performance costs 354B. Cost set 354 may be used with remediation selection 356 to select a remediation plan 358. Remediation plan 358 may include repairing or replacing the impaired device to maintain normal operation of the deployment.

Figure 4A:
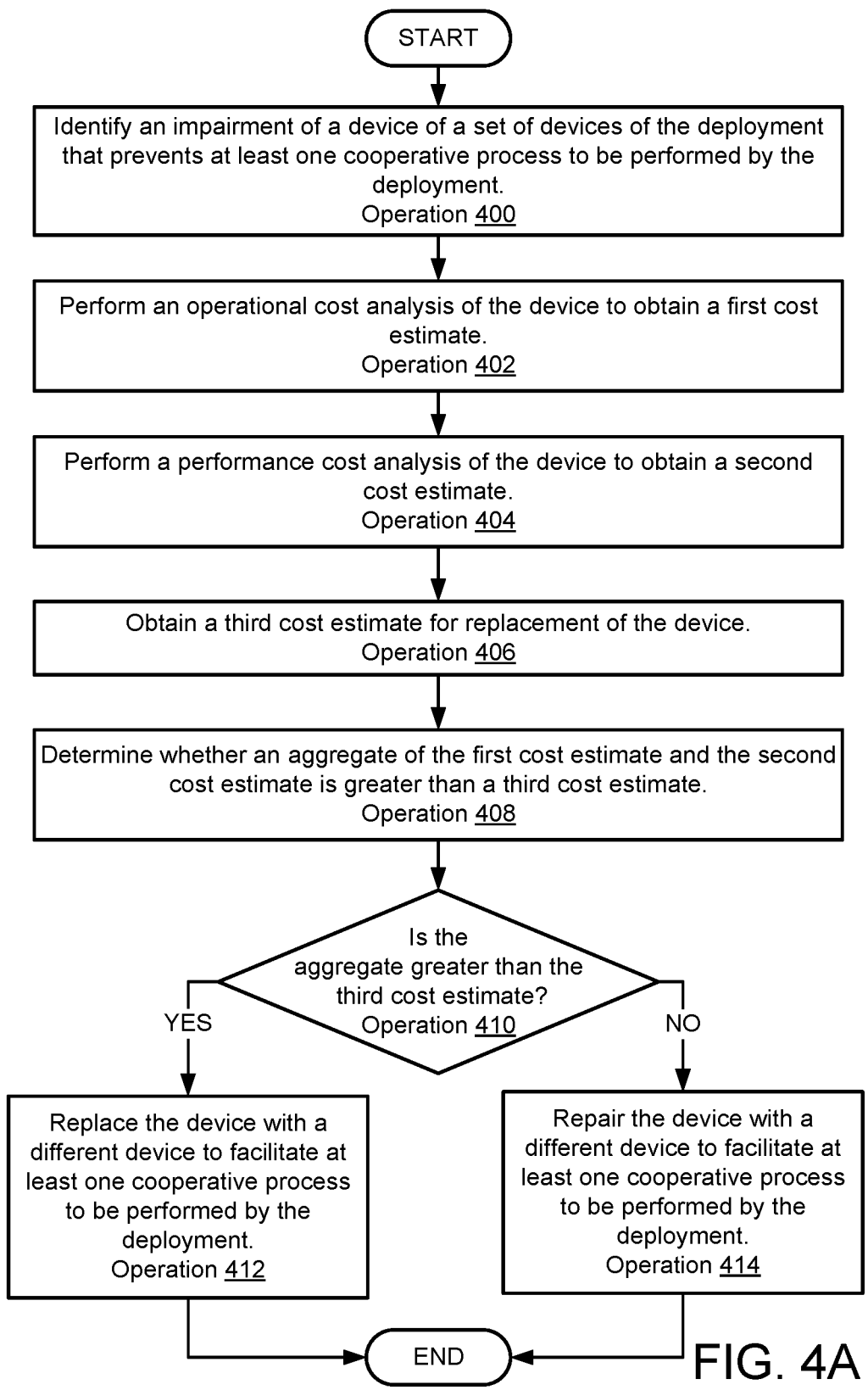
FIGS. 4A-4B show flow diagrams illustrating a method of managing operation of data processing systems in accordance with an embodiment.
Figure 4B:
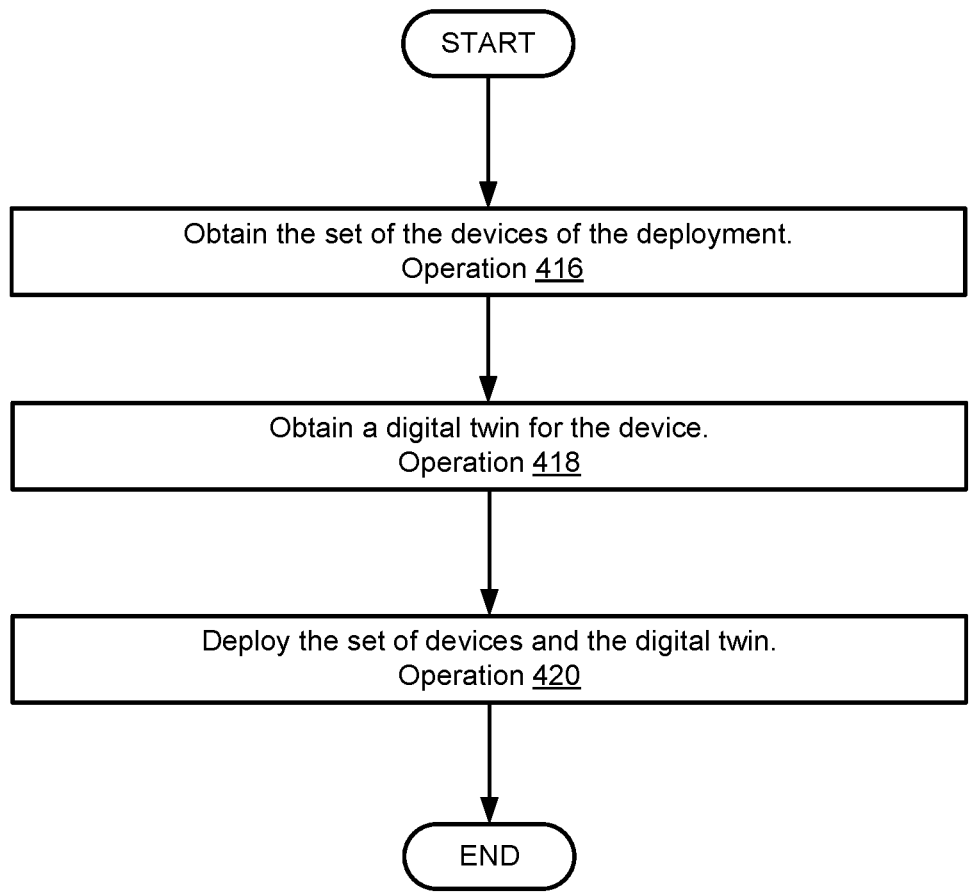

As discussed above, the components of FIG. 1 may perform various methods to manage operations of a set of devices within a network of devices. FIGS. 4A-4B illustrate methods that may be performed by the components of FIG. 1.

Turning to FIG. 4A, a flow diagram illustrating identification and remediation of an impaired device is shown. The method may be performed, for example, by failure aggregator 102, one or more IoT devices (e.g., 100A, 100N), and/or other components of the system of FIG. 1.

At operation 400, an impairment of a device of a set of devices of the deployment may be identified that prevents at least one cooperative process to be performed by the deployment. The impairment may be identified by typifying the impairment within the device of the set of devices of the deployment that restricts normal operation of the device. The impairment may be typified by noting the source of the impairment and the effects of the impairment on the cooperative process.

At operation 402, an operational cost analysis of the device may be performed to obtain a first cost estimate. The operational cost analysis of the device may be performed by performing an analysis of a source of the impairment within the device of the set of devices of the deployment and analyzing requirements of the device of a set of devices of the deployment with the impairment, based on the analysis of the source of the impairment, to repair the device in order to maintain the cooperative processes to be performed by the development. Performing an analysis of the source of the impairment may be performed by diagnosing the device. The requirements of the device of a set of devices of the deployment may be analyzed by understanding the source of the impairment.

At operation 404, a performance cost analysis of the device may be performed to obtain a second cost estimate. The performance cost analysis of the device may be performed by obtaining the cost of a new device of the set of devices of the deployment and power requirements to run the device of the set of devices of the deployment and tracing effects of the impairment through the device of the set of devices of the deployment and through the cooperative process. The cost of a new device of the set of devices of the deployment and power requirements to run the device of the set of devices of the deployment may be obtained by researching market costs and manufacturing specifications of the device. The effects of the impairment may be traced by analyzing the output the device with an impairment, which may introduce input conditions into another device along a pathway.

At operation 406, a third cost estimate may be obtained for the replacement of the device. The third cost may be obtained by querying for prices of the device from vendors.

At operation 408, an aggregate of the first cost estimate and the second cost estimate may be determined whether to be greater than a third cost estimate. The aggregate of the first cost estimate and second cost estimate may be determined by summing the operational cost and the performance cost.

At operation 410, a determination may be made regarding whether the aggregate is greater than the third cost estimate. The determination may be made by comparing the magnitude of the aggregate to the magnitude of the third cost.

If the aggregate is greater than the third cost estimate, then the method may proceed to operation 412. If the aggregate is not greater than the third cost estimate, then the method may proceed to operation 414.

At operation 412, if the aggregate is greater than the third cost estimate, then the impaired device may be replaced with a different device to facilitate at least one cooperative process to be performed by the deployment. The impaired device may be replaced by acquiring outside available resources a new instantiation of the device of the set of devices of the development that is free of impairment and can operate normally within the deployment. Outside available resources may be acquired by implementing components and tools already acquired and in proximity to the deployment. Components and tools already acquired and in proximity to the deployment may be implemented by executing processes and plans known already by the deployment.

At operation 414, if the aggregate is not greater than the third cost estimate, then the impaired device may be repaired with a different device to facilitate at least one cooperative process to be performed by the deployment. The impaired device may be repaired by remediating the impairment of the device of the set of devices of the deployment with readily available resources to regain normal operation of the device of the set of devices of the deployment. Outside available resources may be acquired by implementing components and tools already acquired and in proximity to the deployment. Components and tools already acquired and in proximity to the deployment may be implemented by executing processes and plans known already by the deployment.

The method may end following operation 414.

Turning to FIG. 4B, a flow diagram illustrating the construction of deployment is shown.

At operation 416, the set of devices of the deployment may be obtained. A set of devices may be obtained by purchasing the devices from a vendor or transferring devices from another deployment.

At operation 418, the digital twin for the device may be obtained. The digital twin may be obtained from storage on disk or from another deployment.

At operation 420, the set of devices and the digital twin may be deployed. The set of devices and the digital twin may be deployed by initiating operation of the digital twin and implementing the deployment that comprises the set of devices and the digital twin.

The method may end following operation 418.

Figure 5:
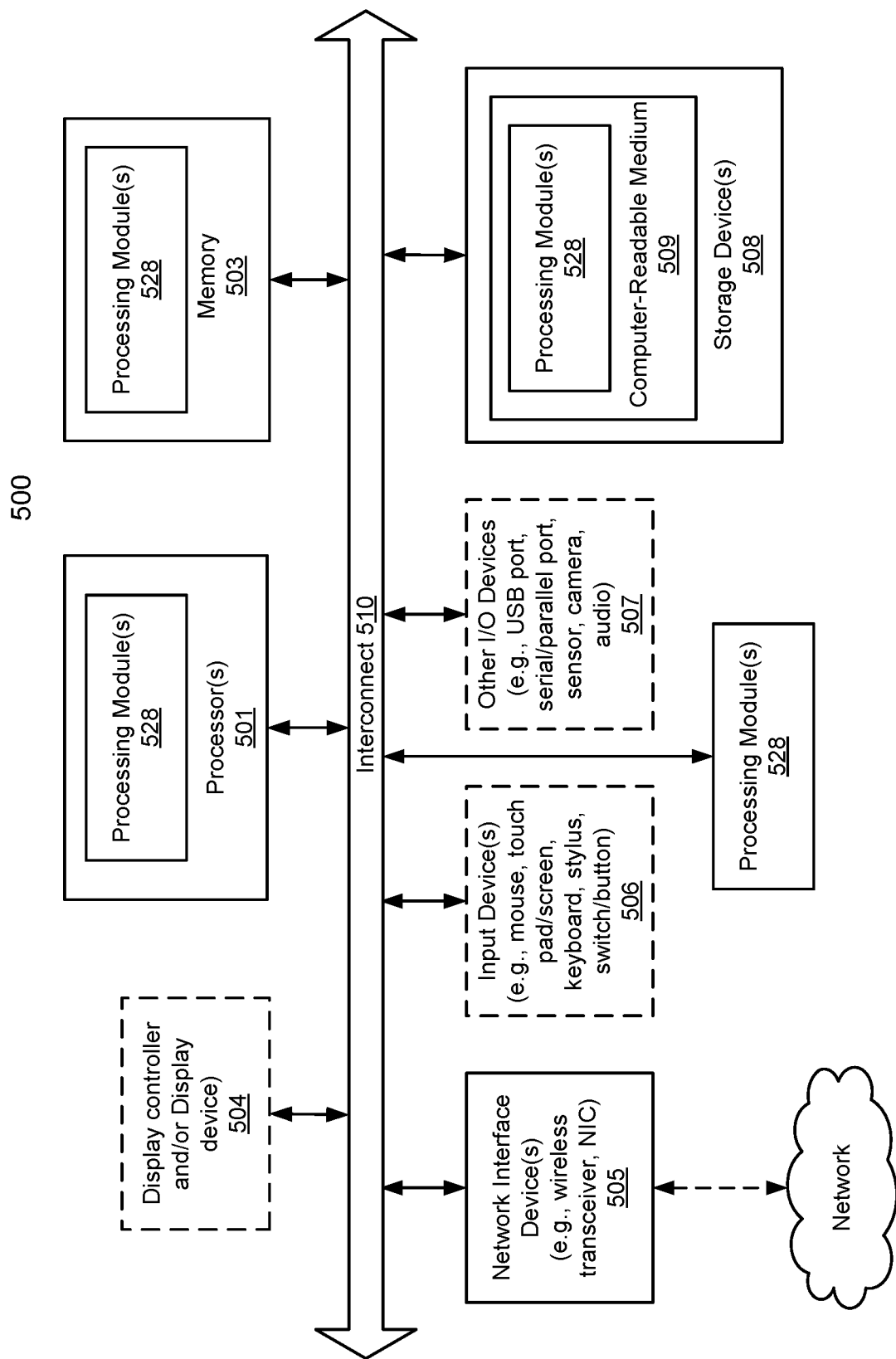
FIG. 5 shows a block diagram illustrating a data processing system in accordance with an embodiment.

Any of the components illustrated in FIGS. 1-3D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for remediating devices within a deployment, the method being executed by a data processing system configured as a failure aggregator of the deployment and comprising:
    identifying an impairment of a device of a set of devices of the deployment that prevents at least one cooperative process being performed by the deployment;
    performing an operational cost analysis of the device to obtain a first cost estimate;
    performing a performance cost analysis of the device to obtain a second cost estimate;
    obtaining an aggregate cost estimate using the first cost estimate and the second cost estimate;
    obtaining a third cost estimate for replacement of the device;
    making a determination regarding whether the aggregate is greater than the third cost estimate;
    in a first instance of the determination where the aggregate is greater than the third cost estimate:
        replacing the device with a different device to facilitate at least one cooperative process to be performed by the deployment; and
    in a second instance of the determination where the aggregate is not greater than the third cost estimate:
        repairing the device to facilitate at least one cooperative process to be performed by the deployment; and
    executing, while the device is still impaired and before the device is replaced or repaired, a digital twin of the device stored in the failure aggregator to cause the failure aggregator to simulate processes and operations of the device required for the at least one cooperative process to prevent extended disruption of the at least one cooperative process being performed by the deployment.

2. The method of claim 1, further comprising:
    prior to identifying the impairment:
        obtaining the set of the devices of the deployment;
        obtaining the digital twin for the device and storing the digital twin in the failure aggregator; and
        deploying the set of devices.

3. The method of claim 1, wherein identifying the impairment of the device comprises:
    typifying the impairment within the device of the set of devices of the deployment that restricts normal operation of the device.

4. The method of claim 1, wherein performing the operational cost analysis comprises:
    performing an analysis of a source of the impairment within the device of the set of devices of the deployment; and
    analyzing requirements of the device of a set of devices of the deployment with the impairment, based on the analysis of the source of the impairment, to repair the device in order to maintain the at least one cooperative process to be performed by the deployment.

5. The method of claim 1, wherein performing the performance cost analysis comprises:
    obtaining a cost of a new device of the set of devices of the deployment and power requirements to run the device of the set of devices of the deployment; and
    tracing effects of the impairment through the device of the set of devices of the deployment and through the at least one cooperative process.

6. The method of claim 1, wherein replacing the device comprises:
    acquiring outside available resources for a new instantiation of the device of the set of devices of the deployment, the new instantiation being free of impairment and can operate normally within the deployment.

7. The method of claim 6, wherein repairing the device comprises:
    remediating the impairment of the device of the set of devices of the deployment with readily available resources to regain normal operation of the device of the set of devices of the deployment.

8. The method of claim 7, wherein using available resources comprises:
    implementing components and tools already acquired and in proximity to the deployment.

9. A non-transitory machine-readable medium having instructions stored therein, which when executed by a processor of a data processing system, cause the processor to perform operations for remediating devices within a deployment, the operations comprising:

identifying an impairment of a device of a set of devices of the deployment that prevents at least one cooperative process being performed by the deployment;
performing an operational cost analysis of the device to obtain a first cost estimate;
performing a performance cost analysis of the device to obtain a second cost estimate;
obtaining an aggregate cost estimate using the first cost estimate and the second cost estimate;
obtaining a third cost estimate for replacement of the device;
making a determination regarding whether the aggregate is greater than the third cost estimate;
in a first instance of the determination where the aggregate is greater than the third cost estimate:
replacing the device with a different device to facilitate at least one cooperative process to be performed by the deployment; and
in a second instance of the determination where the aggregate is not greater than the third cost estimate:
repairing the device to facilitate at least one cooperative process to be performed by the deployment; and
executing, while the device is still impaired and before the device is replaced or repaired, a digital twin of the device stored in the data processing system to cause the data processing system to simulate processes and operations of the device required for the at least one cooperative process to prevent extended disruption of the at least one cooperative process being performed by the deployment.

10. The non-transitory machine-readable medium of claim 9, wherein the operations further comprise:
prior to identifying the impairment:
obtaining the set of the devices of the deployment;
obtaining the digital twin for the device and storing the digital twin in the data processing system; and
deploying the set of devices.

11. The non-transitory machine-readable medium of claim 9, wherein identifying the impairment of the device comprises:
typifying the impairment within the device of the set of devices of the deployment that restricts normal operation of the device.

12. The non-transitory machine-readable medium of claim 9, wherein performing the operational cost analysis comprises:
performing an analysis of a source of the impairment within the device of the set of devices of the deployment; and
analyzing requirements of the device of a set of devices of the deployment with the impairment, based on the analysis of the source of the impairment, to repair the device in order to maintain the at least one cooperative process to be performed by the deployment.

13. The non-transitory machine-readable medium of claim 9, wherein performing the performance cost analysis comprises:
obtaining a cost of a new device of the set of devices of the deployment and power requirements to run the device of the set of devices of the deployment; and
tracing effects of the impairment through the device of the set of devices of the deployment and through the at least one cooperative process.

14. The non-transitory machine-readable medium of claim 9, wherein replacing the device comprises:
acquiring outside available resources for a new instantiation of the device of the set of devices of the deployment, the new instantiation being free of impairment and can operate normally within the deployment.

15. A data processing system, comprising:
a processor; and
a memory coupled to the processor to store instructions, which when executed by the processor, cause the processor to perform operations for remediating devices within a deployment, the operations comprising:
identifying an impairment of a device of a set of devices of the deployment that prevents at least one cooperative process to be performed by the deployment;
performing an operational cost analysis of the device to obtain a first cost estimate;
performing a performance cost analysis of the device to obtain a second cost estimate;
obtaining an aggregate cost estimate using the first cost estimate and the second cost estimate;
obtaining a third cost estimate for replacement of the device;
making a determination regarding whether the aggregate is greater than the third cost estimate;
in a first instance of the determination where the aggregate is greater than the third cost estimate:
replacing the device with a different device to facilitate at least one cooperative process to be performed by the deployment; and
in a second instance of the determination where the aggregate is not greater than the third cost estimate:
repairing the device to facilitate at least one cooperative process to be performed by the deployment; and
executing, while the device is still impaired and before the device is replaced or repaired, a digital twin of the device stored in the data processing system to cause the data processing system to simulate processes and operations of the device required for the at least one cooperative process to prevent extended disruption of the at least one cooperative process being performed by the deployment.

16. The data processing system of claim 15, wherein the operations further comprise:
prior to identifying the impairment:
obtaining the set of the devices of the deployment;
obtaining the digital twin for the device and storing the digital twin in the data processing system; and
deploying the set of devices.

17. The data processing system of claim 15, wherein identifying the impairment of the device comprises:
typifying the impairment within the device of the set of devices of the deployment that restricts normal operation of the device.

18. The data processing system of claim 15, wherein performing the operational cost analysis comprises:
performing an analysis of a source of the impairment within the device of the set of devices of the deployment; and
analyzing requirements of the device of a set of devices of the deployment with the impairment, based on the analysis of the source of the impairment, to repair the device in order to maintain the at least one cooperative process to be performed by the deployment.

19. The data processing system of claim 15, wherein performing the performance cost analysis comprises:

obtaining a cost of a new device of the set of devices of the deployment and power requirements to run the device of the set of devices of the deployment; and tracing effects of the impairment through the device of the set of devices of the deployment and through the at least one cooperative process.

20. The data processing system of claim 15, wherein replacing the device comprises:

acquiring outside available resources for a new instantiation of the device of the set of devices of the deployment, the new instantiation being free of impairment and can operate normally within the deployment.

\* \* \* \* \*